US009798371B2

(12) United States Patent
Seo et al.

(10) Patent No.: US 9,798,371 B2
(45) Date of Patent: Oct. 24, 2017

(54) ELECTRONIC DEVICE AND CONTENT DISPLAY METHOD THEREOF

(71) Applicant: Samsung Electronics Co., Ltd., Gyeonggi-do (KR)

(72) Inventors: Seok-Weon Seo, Gyeonggi-do (KR); Jong-Bum Choi, Gyeonggi-do (KR); Sang-Ho Kim, Gyeonggi-do (KR); Bo-Seok Moon, Gyeonggi-do (KR); Yang-Wook Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 73 days.

(21) Appl. No.: 14/731,822

(22) Filed: Jun. 5, 2015

(65) Prior Publication Data
US 2015/0301578 A1    Oct. 22, 2015

Related U.S. Application Data

(63) Continuation-in-part of application No. 14/297,225, filed on Jun. 5, 2014.

(30) Foreign Application Priority Data

Jun. 5, 2013   (KR) .................. 10-2013-0064521
Jan. 15, 2014  (KR) .................. 10-2014-0005031

(51) Int. Cl.
*G06F 1/32*    (2006.01)
*G06F 1/26*    (2006.01)
(Continued)

(52) U.S. Cl.
CPC ............ *G06F 1/3206* (2013.01); *G06F 1/266* (2013.01); *G06F 1/3265* (2013.01);
(Continued)

(58) Field of Classification Search
CPC ......... G06F 1/32; G06F 1/3206; G06F 1/3265
(Continued)

(56) References Cited

U.S. PATENT DOCUMENTS 6,294,895 B1   9/2001  Kukai
6,668,179 B2*  12/2003 Jiang ................ H04W 52/0277
                                                  455/404.1

(Continued)

FOREIGN PATENT DOCUMENTS

EP      2 493 161       8/2012
KR   1020010071113      7/2001
(Continued)

OTHER PUBLICATIONS

Nairan Zhang et al., "PowerVisor: A Battery Virtualization Scheme for Smartphones", Proceedings of the Third ACM Workshop on Mobile Cloud Computing and Services, MCS '12, Jun. 25, 2012, XP055310983, 8 Pages.

(Continued)

*Primary Examiner* — Chun Cao
(74) *Attorney, Agent, or Firm* — The Farrell Law Firm, P.C.

(57) ABSTRACT

An electronic device and a content display method are provided. A content display method of an electronic device includes displaying an application in the electronic device; and changing a content display mode of the application, when a detected battery consumption of the application exceeds a threshold logical battery capacity assigned to the application.

20 Claims, 36 Drawing Sheets

(51) Int. Cl.
*G06F 9/50* (2006.01)
*G06Q 10/00* (2012.01)

(52) U.S. Cl.
CPC .......... *G06F 1/3287* (2013.01); *G06F 9/5094* (2013.01); *G06Q 10/00* (2013.01); *Y02B 60/1282* (2013.01); *Y02B 60/142* (2013.01)

(58) Field of Classification Search
USPC .................................................. 713/320, 340
See application file for complete search history.

(56) References Cited

U.S. PATENT DOCUMENTS

| | | | |
|---|---|---|---|
| 6,801,811 B2 * | 10/2004 | Ranganathan | G06F 1/3203 345/211 |
| 7,057,372 B2 * | 6/2006 | Chen | G06F 1/3215 320/106 |
| 7,616,197 B1 * | 11/2009 | Gettemy | G06F 1/3203 345/102 |
| 7,825,631 B2 | 11/2010 | Chen et al. | |
| 7,873,852 B2 | 1/2011 | Bell | |
| 8,538,484 B2 * | 9/2013 | Chan | G06F 1/28 455/566 |
| 8,958,854 B1 * | 2/2015 | Morley | H04M 1/72563 370/311 |
| 2005/0062612 A1 | 3/2005 | Smith et al. | |
| 2005/0085277 A1 | 4/2005 | Chen et al. | |
| 2005/0125700 A1 | 6/2005 | Chang et al. | |
| 2005/0250531 A1 | 11/2005 | Takebe et al. | |
| 2006/0214638 A1 | 9/2006 | Chen et al. | |
| 2006/0279256 A1 | 12/2006 | Bletsas | |
| 2007/0004467 A1 * | 1/2007 | Chary | G06F 1/3203 455/572 |
| 2007/0243852 A1 | 10/2007 | Gibbs | |
| 2008/0141049 A1 * | 6/2008 | Hassan | G06F 1/3203 713/320 |
| 2008/0186086 A1 | 8/2008 | Bell | |
| 2008/0307243 A1 | 12/2008 | Lee | |
| 2010/0060238 A1 | 3/2010 | Chen et al. | |
| 2011/0040996 A1 | 2/2011 | Hackborn et al. | |
| 2011/0260691 A1 | 10/2011 | Ishibashi et al. | |
| 2011/0264899 A1 | 10/2011 | Evans et al. | |
| 2012/0047379 A1 | 2/2012 | Chen et al. | |
| 2012/0221878 A1 | 8/2012 | Pocklington et al. | |
| 2013/0007662 A1 | 1/2013 | Bank et al. | |
| 2013/0196720 A1 * | 8/2013 | Sivaraman | H04W 52/0261 455/573 |
| 2014/0068314 A1 * | 3/2014 | Kim | G06F 1/3212 713/340 |
| 2014/0365789 A1 * | 12/2014 | Seo | G06F 1/266 713/300 |
| 2015/0179149 A1 * | 6/2015 | Park | G06F 3/013 345/698 |

FOREIGN PATENT DOCUMENTS

| | | |
|---|---|---|
| KR | 1020050117088 | 12/2005 |
| KR | 10-0668758 | 1/2007 |
| KR | 1020090012788 | 2/2009 |
| KR | 1020120129257 | 11/2012 |

OTHER PUBLICATIONS

European Search Report dated Oct. 25, 2016 issued in counterpart application No. 14807077.4-1959, 10 pages.
U.S. Office Action dated Feb. 16, 2016 issued in counterpart U.S. Appl. No. 14/297,225, 26 pages.
U.S. Office Action dated Aug. 24, 2016 issued in counterpart U.S. Appl. No. 14/297,225, 23 pages.
U.S. Office Action dated Sep. 18, 2017 issued in counterpart U.S. Appl. No. 14/297,225, 29 pages.

* cited by examiner

| FUNCTION OR APPLICATION | PERCENT (%) |
|---|---|
| K-talk | 30 |
| Facebook | 15 |
| Telephone | 10 |
| Game | 5 |
| ... | ... |

FIG.10

| | MON | TUE | WED | ... | SUN |
|---|---|---|---|---|---|
| K-talk | 15HOURS (10) 17HOURS (20) | 11HOURS (5) 10HOURS (1) | 9HOURS (15) 13HOURS (10) | ... | 10HOURS (30) 12HOURS (30) |
| Facebook | 15HOURS (10) 17HOURS (20) | 11HOURS (5) 10HOURS (1) | 9HOURS (15) 13HOURS (10) | ... | 10HOURS (25) 12HOURS (25) |
| Telephone | ... | ... | ... | ... | ... |
| ⋮ | ⋮ | ⋮ | ⋮ | ⋮ | ⋮ |

FIG.11

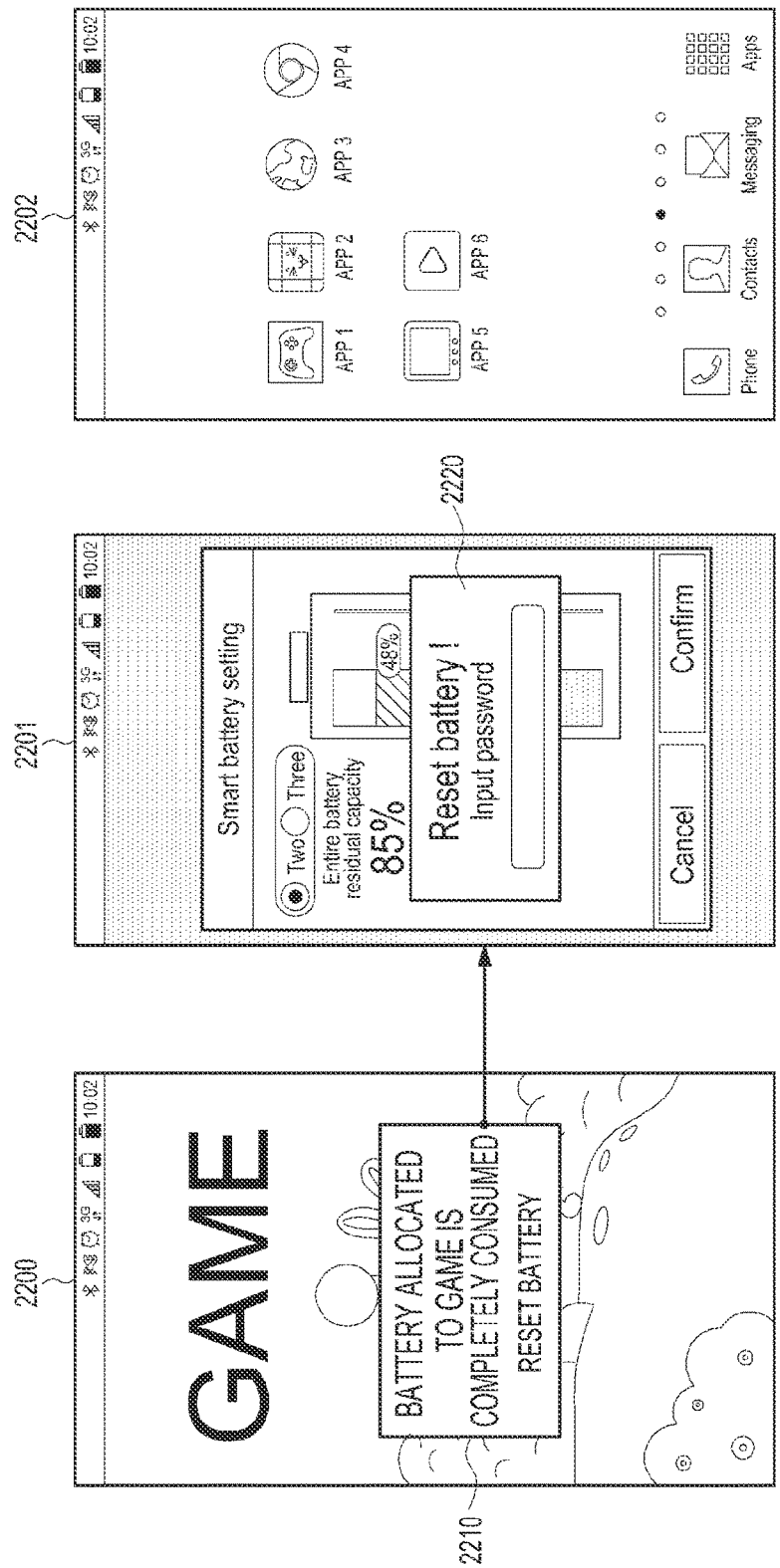

ELECTRONIC DEVICE AND CONTENT DISPLAY METHOD THEREOF

PRIORITY

This application is a Continuation-In-Part of U.S. application Ser. No. 14/297,225, which was filed in the U.S. Patent and Trademark Office on Jun. 5, 2014, and claims priority under 35 U.S.C. §119(a) to Korean Application Serial Nos. 10-2013-0064521 and 10-2014-0005031, which were filed in the Korean Intellectual Property Office on Jun. 5, 2013 and Jan. 15, 2014, respectively, the entire content of each of which is incorporated herein by reference.

BACKGROUND

1. Field of the Invention

The present invention relates generally to an electronic device and a content display method thereof, and more specifically, to an electronic device and a content display method thereof, which change a content display mode in response to a threshold logical battery capacity assigned to an application.

2. Description of the Related Art

In recent years, electronic devices using a battery, such as portable computers, mobile phones, smart phones, and the like, have increased in number with the development of electronic technologies. Battery information according to a charged or discharged state of the battery plays an important role in using the electronic devices. For example, in the electronic devices, residual battery capacity information representing how much battery capacity is left is important for storing currently processed data or protecting the electronic device before the battery thereof is discharged. Further, the residual battery capacity information is important fir predicting how long a user can continue to use the electronic devices. Accordingly, today's electronic devices employ various methods for providing the battery information to users.

Electronic devices such as portable computers, mobile phones, smart phones, and the like can provide numerous functions and can independently perform each of the functions. The functions may be provided in an application form. However, the electronic devices have only one battery supplying electrical power for the functions. Thus, if the battery is completely consumed when a user uses one function of the electronic device, the user cannot use other functions.

For example, in an electronic device having a telephone function, a Global Positioning System (GPS) function, and a web-browser function, when a user wants to use the telephone function after the web-browser function, if a battery thereof is completely consumed, the user cannot use the telephone function. Accordingly, the user should be able to predict in advance the residual battery capacity for each of the functions. However, it is difficult to check the residual battery capacity that is needed for each of the functions through the entire battery residual capacity.

Normally, residual battery capacity information is displayed as percentage, e.g., 50%, and/or as an image representing the residual battery capacity information, e.g., an image of a battery half full, on a status bar of a screen of the electronic devices.

Further, various methods are being developed for reducing battery consumption of electronic devices having a large display and supporting a high resolution. For example, in order to reduce the battery consumption of the electronic devices, a brightness of a screen may be automatically changed according to a residual battery capacity. In addition, when there is no user input for a predetermined period of time, the electronic devices may turn off their screens.

SUMMARY

The present invention has been made to address the above-identified problems and disadvantages, and to provide at least advantages described below.

Accordingly, an aspect of the present invention is to provide an electronic device and a method of providing battery information by an electronic device, in which a battery in the electronic device is partitioned into logical batteries according to functions so that a user can allocate a logical battery capacity according to the functions of the electronic device.

Another aspect of the present invention is to provide an electronic device and a method of providing battery information of an electronic device in which a battery in an electronic device is partitioned into logical batteries, and a function is automatically allocated to the logical batteries according to a user's use history, for example, according to functions used by the user and use time thereof, so that a battery capacity can be preferentially allocated to the frequently or essentially used functions or the preferred functions.

Another aspect of the present invention is to provide an electronic device and a method of providing battery information of an electronic device, in which a residual capacity for each of logical batteries is displayed according to power consumption used by each of functions allocated to the partitioned logical batteries, so that a user can identify the residual battery capacity according to the functions.

In accordance with an aspect of the present invention, a content display method is provided for an electronic device. The content display method includes displaying an application in the electronic device; and changing a content display mode of the application, when a detected battery consumption of the application exceeds a threshold logical battery capacity assigned to the application.

In accordance with another aspect of the present invention, a content display method is provided for an electronic device. The content display method includes storing application battery assignment information including a name of an application, a logical battery capacity assigned to the application, a threshold logical battery capacity assigned to the application, and a content display mode change; displaying the application in the electronic device; and changing the content display mode of the application, when a detected battery consumption of the application exceeds the logical battery capacity. The logical battery capacity of the application is the same as the threshold logical battery capacity of the application.

In accordance with one aspect of the present invention, an electronic device is provided, which includes a touch screen that displays an application; and a controller that changes a content display mode of the application, when a calculated battery consumption of the application exceeds a threshold logical battery capacity assigned to the application.

BRIEF DESCRIPTION OF THE DRAWINGS

The above and other aspects, features, and advantages of certain embodiments of the present invention will be more apparent from the following detailed description, taken in conjunction with the accompanying drawings, in which:

FIGS. 10 and 11 illustrate examples of an application use history according to an embodiment of the present invention;

FIGS. 21A-21B and 22A-22C illustrate examples of a screen when at least one or more logical batteries are discharged according to an embodiment of the present invention;

DETAILED DESCRIPTION OF EMBODIMENTS OF THE PRESENT INVENTION

Figure 1:
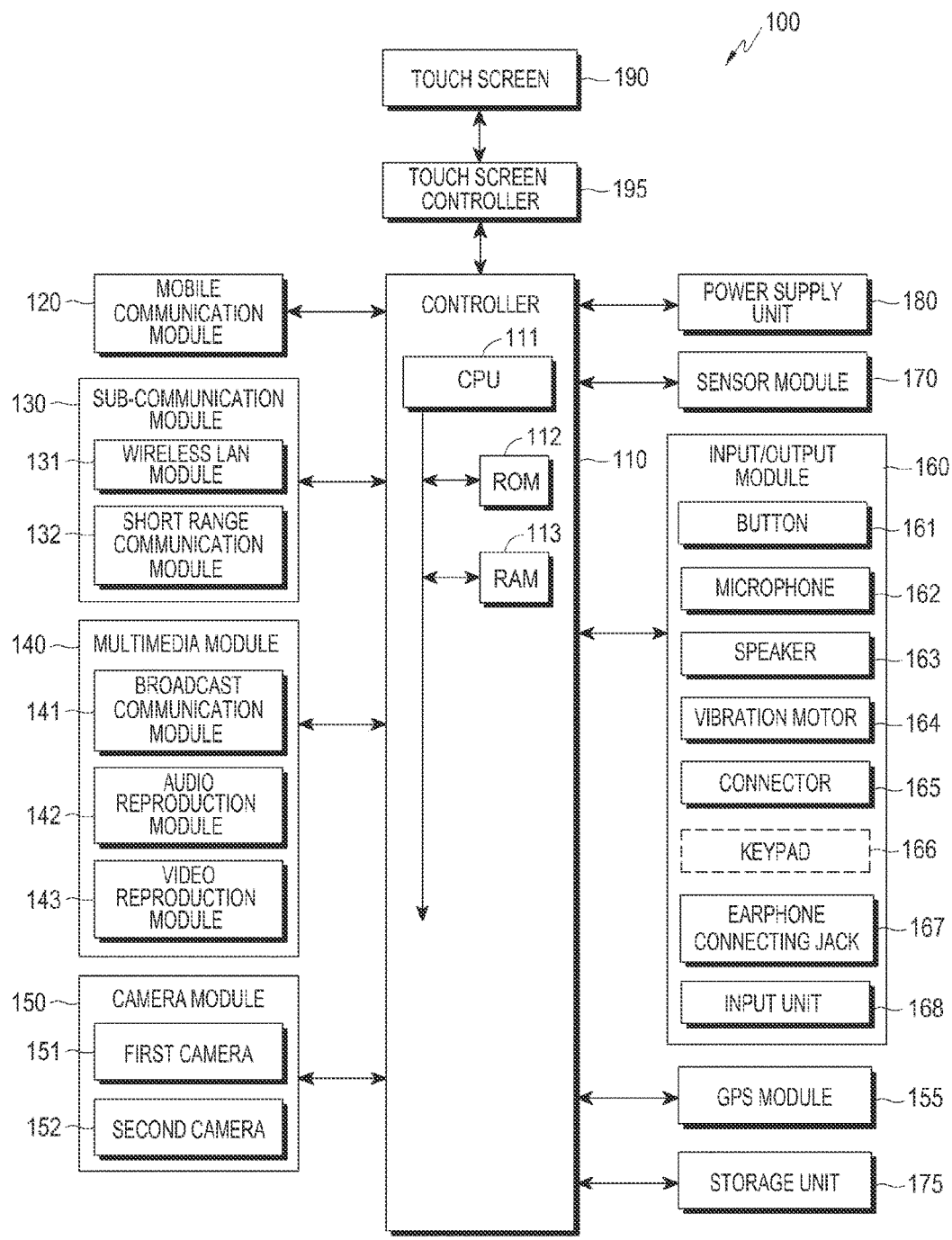
FIG. 1 is a block diagram illustrating a configuration of a mobile terminal according to an embodiment of the present invention.

Hereinafter, various embodiments of the present invention will be described in detail with reference to the accompanying drawings. Further, the methods of manufacturing and using the present invention will be described in detail with reference to accompanying drawings. The same reference numerals represented in each of the drawings indicate the elements or the components that perform substantially the same functions.

Although ordinal terms such as "first" and "second" may be used to describe various elements, these elements are not to be limited by these terms. These terms are used merely for the purpose of distinguishing an element from another element. For example, without departing from the scope of the present invention, a first structural element may be referred to as a second structural element. Similarly, the second structural element also may be referred to as the first structural element.

As used herein, the term "and/or" includes any and all combinations of one or more associated items.

An application indicates software that is used by a user while being executed on a computer Operating System (OS) or a mobile OS. For example, the application may include a word processor application, a spread sheet application, a contact application, a calendar application, a memo application, an alarm application, a Social Network System (SNS) application, a chatting application, a map application, a music player application, or a video player application.

Further, an application may also include software executed in an electronic device or an external device (e.g., a server) connected to the electronic device in a wireless or wired manner.

In addition, an application may also include software executed in the electronic device in response to a received user input.

Content may be displayed in an executed application. For example, content may include a video or audio reproduced in a video player application, audio reproduced in a music player application, a photo displayed in a photo gallery application, a web page displayed in a web browser application, etc. The content may also include audio, a video, text, an image, or a web page that is displayed or executed in another type of application.

The term "video" used herein may be used as the same meaning as a moving image.

The content may include audio, a video, text, an image, or a web page that is executed in response to a received user input (e.g., a touch, etc.). The content includes an executed application screen and as user interface constituting the application screen. In addition, the content may also include one or more pieces of content.

A widget indicates a mini-application that is one of Graphic User Interfaces (GUIs) for more effectively supporting an interaction between a user and an application or an OS. Examples of the widget include a weather widget, a calculator widget, a clock widget, et.

In accordance with an embodiment of the present invention, changing a content display mode on a screen of an application to which a logical battery is assigned may be implemented by a separate application and/or an OS. Alternatively, changing a content display mode on a screen of an application to which a logical battery is assigned may be implemented by separate hardware.

Further, in accordance with an embodiment of the present invention, changing a content display mode on a screen of an application to which a logical battery is assigned may be implemented by a combination of hardware and software (e.g., an application), and/or by a combination of hardware, software (e.g., an application), and an OS.

Herein, a content display mode change indicates a change from a first content display mode of a running application to a second content display mode of running application, wherein in the second content display mode battery consumption can be reduced.

Herein, terms that are used to describe an embodiment of the present invention are not intended to limit and/or restrict the scope of present invention. For example, as used herein, singular forms are intended to include the plural forms as well, unless the context clearly indicates otherwise. Terms such as "include" and/or "have" may be construed to denote a certain characteristic, a number, a step, an operation, a constituent element, a component or a combination thereof, but may not be construed to exclude the existence of or a possibility of addition of one or more other characteristics, numbers, steps, operations, constituent elements, components, or combinations thereof.

Various embodiments of the present invention provide an electronic device and a content display method that change a content display mode of an application, when calculated battery consumption exceeds an application threshold logical battery capacity of pre-stored application battery assignment information.

In addition, various embodiments of the present invention provide an electronic device and a content display method that increase a use time of an application in response to a changed content display mode of the application, when calculated battery consumption exceeds an application threshold logical battery capacity of pre-stored application battery assignment information.

Without being limited thereto, various embodiments of the present invention also provide an electronic device and a content display method that change a content display mode of an application, when battery consumption exceeds a threshold logical battery capacity assigned to the application.

As described above, according to the various embodiments of the present invention, a battery in an electronic device is partitioned into logical batteries according to functions or applications so that a user can allocate a logical battery capacity according to the functions or applications of the electronic device.

Furthermore, according to the various embodiments of the present invention, a battery in an electronic device is partitioned into logical batteries, and functions are automatically allocated to the logical batteries according to a user's use history, for example, according to functions used by the user and use time thereof, so that a battery capacity can be preferentially allocated to frequently or essentially used functions or the preferred functions.

Furthermore, according to the various embodiments of the present invention, a residual capacity for each of logical batteries is displayed according to power consumption used by each of the functions or applications allocated to the partitioned logical batteries so that a user can identity the residual battery capacity according to the functions or applications.

Moreover, according to the various embodiments of the present invention, one application or a category containing at least one or more applications is allocated to the partitioned logical batteries, so that the logical batteries can be used for one application or a plurality of applications corresponding to the same category.

In addition, according to the various embodiments of the present invention, among icons to be displayed on a home screen, icons of applications which are not allocated to the logical batteries are deactivated or are not displayed, so that usage of the applications which are not allocated to the logical batteries can be restricted.

Furthermore, according to the various embodiments of the present invention, when a logical battery is discharged, execution of an application corresponding to the discharged logical battery is interrupted, thereby restricting usage of the application such that the application can be used only for a time period corresponding to the capacity of the logical battery. For example, in a case in which a game application is allocated to one of logical batteries, if the logical battery is completely consumed, execution of the game application is interrupted, thereby restricting usage of the game application such that the game application can be used only for a time period corresponding to the predetermined capacity of the logical battery.

Embodiments of the present invention may be applied to any electronic device capable of performing functions or applications and receiving power from a battery. For example, an electronic device according to an embodiment of the present invention may be a user terminal such as a mobile phone, a smart phone, a tablet Personal Computer (PC), or the like. A mobile terminal will be described as an example of the electronic device in the embodiments of the present invention.

FIG. 1 is a block diagram illustrating a configuration of a mobile terminal according to an embodiment of the present invention. Referring to FIG. 1, the mobile terminal 100 may be connected with an external device by using a mobile communication module 120, a sub-communication module 130, and a connector 165. The "external device" includes a different device from the mobile terminal 100, a mobile phone, a smart phone (not illustrated), a tablet PC, and a server.

Referring to FIG. 1, the mobile terminal 100 includes a touch screen 190 and a touch screen controller 195. Also, the mobile terminal 100 includes a controller 110, the mobile communication module 120, the sub-communication module 130, a multimedia module 140, a camera module 150, a GPS module 155, an input/output module 160, a sensor module 170, a storage unit 175, and a power supply unit 180. The sub-communication module 130 includes at least one of a wireless Local Area Network (LAN) module 131 and a short range communication module 132, and the multimedia module 140 includes at least one of a broadcast communication module 141, an audio reproduction module 142, and a video reproduction module 143. The camera module 150 includes at least one of a first camera 151 and a second camera 152, and the input/output module 160 includes at least one of a button 161, a microphone 162, a speaker 163, a vibration motor 164, a connector 165, a keypad 166, an earphone jack 167, and an input unit 168.

The controller 110 includes a Central Processor Unit (CPU) 111, a Read Only Memory (ROM) 112 storing control programs for controlling the mobile terminal 100, and a Random Access Memory (RAM) 113 which stores signals or data input from the outside of the mobile terminal 100 or is used as a memory region for an operation executed in the mobile terminal 100. The CPU 111 may include a single core, a dual core, a triple core, or a quad core. The CPU 111, the ROM 112 and the RAM 113 may be connected with each other through internal buses.

The controller 110 controls the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195. Namely, the controller 110 performs an overall control function for the mobile terminal 100, and controls signal flows between the above-described configurations.

According to various embodiments of the present invention, the controller 110 partitions a battery into at least one or more logical batteries, sets a capacity of the at least one or more logical batteries, and allocates functions or applications to the at least one or more logical batteries. Furthermore, the controller 110 displays indicators for the at least one or more logical batteries to which the functions or applications are allocated. Moreover, the controller 110 determines a capacity of the logical batteries by using a use history of the functions or applications, and allocates at least one or more applications to the at least one or more logical batteries according to a use history of the applications. In addition, the controller 110 calculates residual capacities for the at least one or more logical batteries by using power consumption used by the functions or applications allocated to the at least one or more logical batteries, and displays the residual capacities for the at least one or more logical batteries. Furthermore, when any one of the logical batteries is discharged, the controller 110 interrupts execution of an application corresponding to the discharged logical battery. Moreover, the controller 110 may add or delete a logical battery, and may change capacities of the logical batteries. In addition, the controller 110 performs a control such that a category including at least one or more applications or one application is allocated to the logical batteries. According to the various embodiments of the present invention, the controller 110 may not display or may deactivate icons of applications which are not allocated to the logical batteries, among icons to be displayed on a home screen when the home screen is displayed, and may not display an icon of an application allocated to a discharged logical battery. Furthermore, when at least one or more logical batteries are discharged, the controller 110 displays an alert message and interrupts execution of applications corresponding to the discharged logical batteries. Moreover, when at least one or more logical batteries are discharged, the controller 110 displays a password input request message, and may change to a general battery operation mode or may reset the logical batteries when a password is input.

The mobile communication module 120 enables the mobile terminal 100 to be connected with an external device through mobile communication by using one antenna or a plurality of antennas under the control of the controller 110. The mobile communication module 120 transmits/receives a wireless signal for a voice call, a video call, a Short Message Service (SMS), or a Multimedia Message Service (MMS) to/from a mobile phone, a smart phone, a tablet PC, or another device, which has a phone number input into the mobile terminal 100.

The sub-communication module 130 includes at least one of the wireless LAN module 131 and the short-range communication module 132. For example, the sub-communication module 130 may include only the wireless LAN module 131, or only the short range communication module 132. Alternatively, the sub-communication module 130 may include both the wireless LAN module 131 and the short range communication module 132.

The wireless LAN module 131 may be connected to the Internet under the control of the controller 110 in a place where a wireless Access Point (AP) is installed. The wireless LAN module 131 supports a wireless LAN standard (IEEE802.11x) of the institute of Electrical and Electronics Engineers (IEEE). The short range communication module 132 may wirelessly perform short range communication between the mobile terminal 100 and an image forming device under the control of the controller 110. The short range communication scheme may include Bluetooth and Infrared Data Association (IrDA) communication The mobile terminal 100 may include at least one of the mobile communication module 120, the wireless LAN module 131, and the short range communication module 132 according to a capability thereof. For example, the mobile terminal 100 may include a combination of the mobile communication module 120, the wireless LAN module 131, and the short range communication module 132 according to the capability thereof.

The multimedia module 140 includes the broadcast communication module 141, the audio reproduction module 142 and the video reproduction module 143. The broadcast communication module 141 receives a broadcast signal (e.g., a TV broadcast signal, a radio broadcast signal or a data broadcast signal) or broadcast additional information (e.g., Electric Program Guide (EPG) or Electric Service Guide (ESG)) which is transmitted from a broadcast station through a broadcast communication antenna under the control of the controller 110. The audio reproduction module 142 reproduces a stored or received digital audio file (e.g., a file having a file extension of mp3, wma, ogg, or wav) under the control of the controller 110. The video reproduction module 143 reproduces a stored or received digital video file (e.g., a file having a file extension of mpeg, mpg, mp4, avi, mov, or mkv) under the control of the controller 110. The video reproduction module 143 may reproduce a digital audio file. The multimedia module 140 may include the audio reproduction module 142 and the video reproduction module 143 without the broadcast communication module 141. Also, the audio reproduction module 142 or the video reproduction module 143 of the multimedia module 140 may be included in the controller 110.

The camera module 150 includes at least one of the first camera 151 and the second camera 152, each of which photographs a still image or a moving image under the control of the controller 110. In addition, the first camera 151 or the second camera 152 may include an auxiliary light source (e.g. a flash) that provides an amount of light required for photography. The first camera 151 may be disposed on a front surface of the mobile terminal 100, and the second camera 152 may be disposed on a rear surface of the mobile terminal 100. It is possible for the first camera 151 and the second camera 152 to be disposed to be adjacent to each other (e.g., an interval between the first camera 151 and the second camera 152 is larger than 1 cm and smaller than 8 cm) to photograph a three-dimensional still image or a three-dimensional moving image.

The GPS module 155 receives radio waves from a plurality of GPS satellites in Earth's orbit and calculates a position of the mobile terminal 100 by using Time of Arrival information from the GPS satellites to the mobile terminal 100.

The input/output module 160 includes at least one of a plurality of buttons 161, the microphone 162, the speaker 163, the vibration motor 164, the connector 165, the keypad 166, the earphone connecting jack 167, and the input unit 168.

The buttons 161 may be formed on the front surface, side surfaces or rear surface of the housing of the mobile terminal 100, and may include at least one of a power button, a lock button, a volume button, a menu button, a home button, a back button, and a search button 161.

The microphone 162 receives a voice or a sound to generate an electrical signal under the control of the controller 110.

The speaker 163 outputs sounds corresponding to various signals of the mobile communication module 120, the sub-communication module 130, the multimedia module 140, and the camera module 150 (e.g., a radio signal, a broadcast signal, a digital audio file, a digital video file, or photographing) to the outside of the mobile terminal 100 under the control of the controller 110. The speaker 163 may output a sound (for example, a button tone corresponding to phone communication or a ring tone) corresponding to a function performed by the mobile terminal 100. One or more speakers 163 may be formed at a proper position or positions of the housing of the mobile terminal 100.

The vibration motor 164 converts an electrical signal to mechanical vibration under the control of the controller 110. For example, when the mobile terminal 100 in a vibration mode receives a voice call from any other device, the vibration motor 164 operates. One or more vibration motors 164 may be provided in the housing of the mobile terminal 100. The vibration motor 164 may operate in response to a touch operation of a user who touches the touch screen 190, and a continuous movement of a touch on the touch screen 190.

The connector 165 may be used as an interface interconnecting the mobile terminal 100 and an external device or a power source. The mobile terminal 100 may transmit data stored in the storage unit 175 of the mobile terminal 100 to the external device or may receive data from the external device through a wired cable connected to the connector 165 under the control of the controller 110. The mobile terminal 100 may receive power from a power source through the wired cable connected to the connector 165 or may charge a battery.

The keypad 166 receives a key input from a user for control of the mobile terminal 100. The keypad 166 includes a physical keypad formed in the mobile terminal 100 or a virtual keypad displayed on the touch screen 190. The physical keypad formed on the mobile terminal 100 may be omitted according to the capability or configuration of the mobile terminal 100.

Earphones are inserted into the earphone connecting jack 167 to be connected to the mobile terminal 100. The input unit 168 may be a stylus pen. The input unit 168 may be inserted and maintained within the mobile terminal 100, and may be withdrawn or separated from the mobile terminal 100 for use thereof.

The sensor module 170 includes at least one sensor for detecting a state of the mobile terminal 100. For example, the sensor module 170 may include a proximity sensor that detects whether the user approaches the mobile terminal 100, an illumination sensor that detects an amount of light around the mobile terminal 100, or a motion sensor that detects a motion of the mobile terminal 100 (e.g., rotation of the mobile terminal 100, or acceleration or vibration applied to the mobile terminal 100). At least one sensor may detect the state, and may generate a signal corresponding to the detection to transmit the generated signal to the controller 110. The sensor of the sensor module 170 may be added or omitted according to a capability of the mobile terminal 100.

The storage unit 175 stores signals or data input/output to correspond to an operation of the mobile communication module 120, the sub-communication module 130, the multimedia module 140, the camera module 150, the GPS module 155, the input/output module 160, the sensor module 170, and the touch screen 190 under the control of the controller 110. The storage unit 175 stores applications and a control program for control of the mobile terminal 100 or the controller 110

In particular, the storage unit 175 may include information on a user interface provided by the mobile terminal 100 according to an embodiment of the present invention. Such information on the user interface includes at least one input type, and an input according to the at least one input type.

The term "storage unit" is used as a term which refers to a random data storage device such as the storage unit 175, the ROM 112 and the RAM 113 within the controller 110, or a memory card mounted on the mobile terminal 100 (e.g., a Secure Digital (SD) card or a memory stick). The storage unit may include a non-volatile memory, a volatile memory, a Hard Disc Drive (HDD) or a Solid State Drive (SSD).

The power supplier 180 supplies power to one battery or a plurality of batteries provided to the mobile terminal 100 under the control of the controller 110. The one battery or the plurality of batteries supply power to the mobile terminal 100. In addition, the power supply unit 180 may supply, to the mobile terminal 100, the power input from an external power source through a wired cable connected with the connector 165.

The touch screen 190 provides a user with a User Interface (UI) corresponding to various services (e.g., a voice call, a data transmission, broadcast, and photographing). The touch screen 190 transmits an analog signal corresponding to at least one touch input to the user interface to the touch screen controller 195. The touch screen 190 receives at least one touch input by a user's body (e.g., fingers) or a touchable input means (e.g., a stylus pen). Also, the touch screen 190 may receive a continuous movement of one touch among at least one touch. The touch screen 190 transmits an analog signal corresponding to the continuous movement of the touch input thereto to the touch screen controller 195.

In particular, according to an embodiment of the present invention, the touch screen 190 may display at least one logical battery indicator under the control of the controller 110.

In the various embodiments of the present invention, the touch is not limited to contact between the touch screen 190 and the user's body or the touchable input means, and may include a contactless touch (e.g., the detectable interval between the touch screen 190 and the user's body or the touchable input means is not more than 1 mm). The interval detectable from the touch screen 190 may vary depending on the capability or configuration of the mobile terminal 100. The touch screen 190 may be implemented, for example, in a resistive type, a capacitive type, an Electro Magnetic Resonance (EMR) type, an infrared type, or an acoustic wave type of touch screen, and may also be implemented in at least one combination thereof.

The touch screen controller 195 converts the analog signal received from the touch screen 190 to a digital signal (e.g., X and Y coordinates) and transmits the digital signal to the controller 110. The controller 110 controls the touch screen 190 by using the digital signal received from the touch screen controller 195. For example, the controller 110 may cause a shortcut icon displayed on the touch screen 190 to be selected or may execute the shortcut icon in response to a touch. Further, the touch screen controller 195 may be included in the controller 110.

In addition, the controller 110 may detect various user inputs received through the camera module 150, the input/output module 160, and the sensor module 170, in addition to the input unit 190. The user input may include various types of information input to the mobile terminal 100, such as a gesture, a voice, a pupil action, and a bio signal of the user as well as the touch. The controller 110 controls the mobile terminal 100 to perform a predetermined operation or function corresponding to the detected user input.

Figure 2:
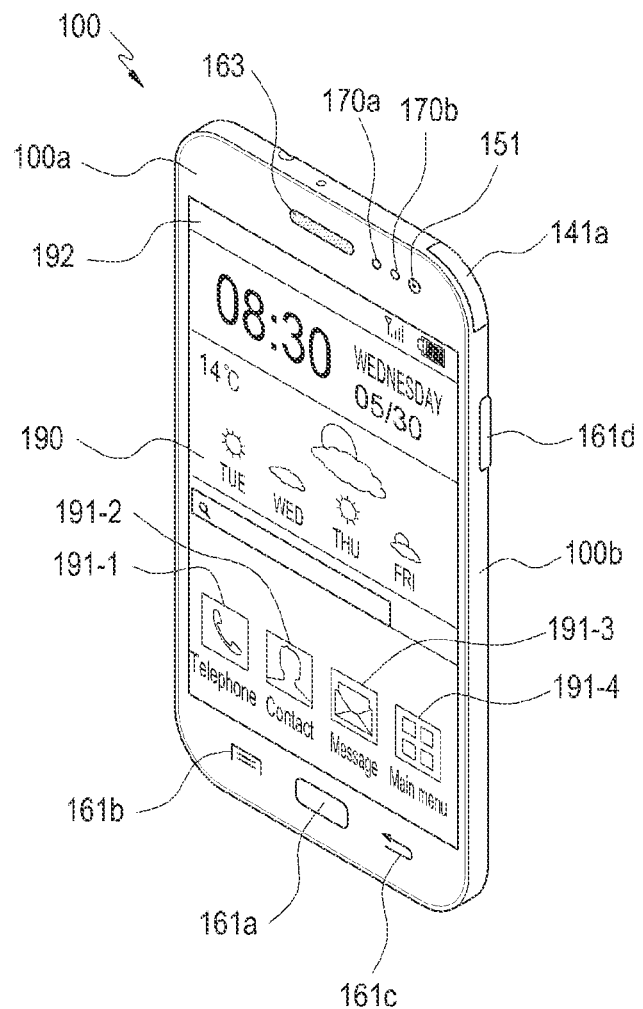
FIG. 2 is a front perspective view of the mobile terminal according to the embodiment of the present invention.
Figure 3:
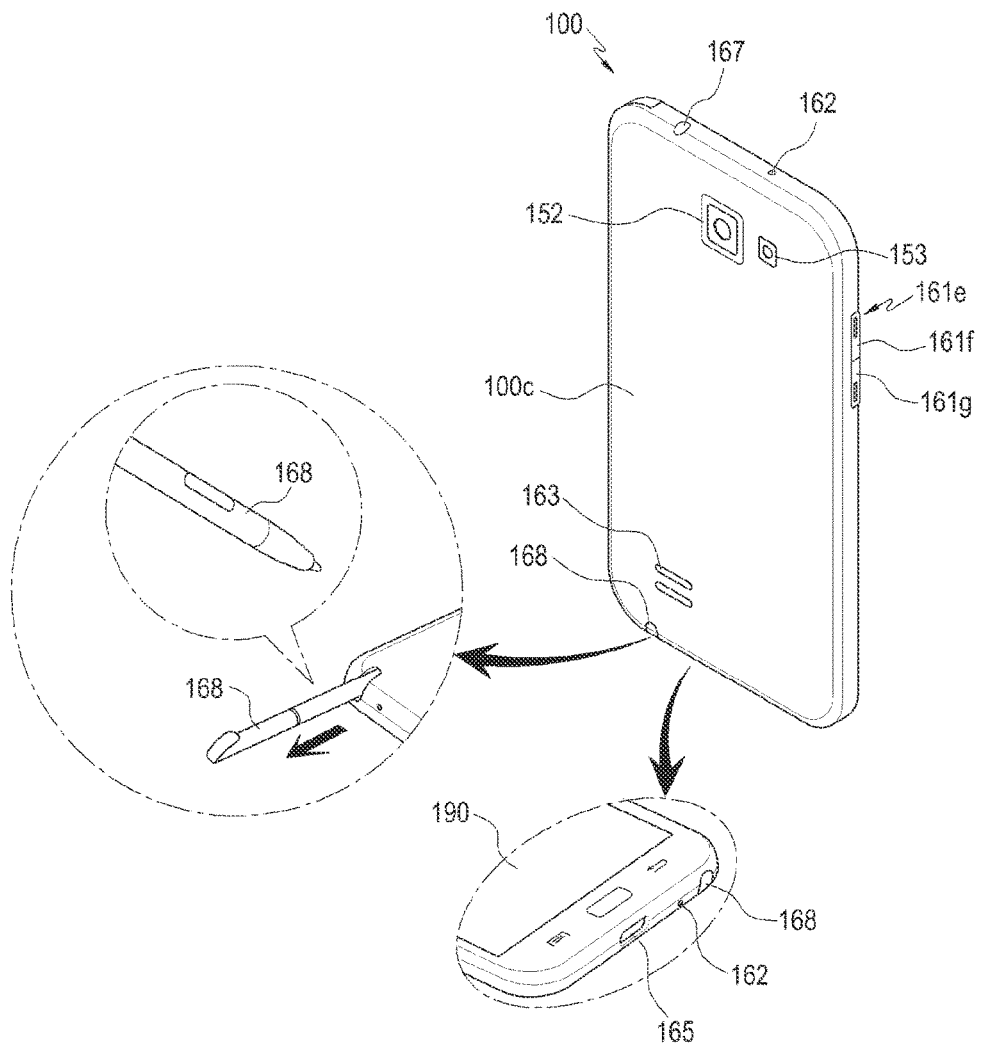
FIG. 3 is a rear perspective view of the mobile terminal according to the embodiment of the present invention.

FIG. 2 is a front perspective view of the mobile terminal according to the embodiment of the present invention, and FIG. 3 is a rear perspective view of the mobile terminal according to the embodiment of the present invention.

Referring to FIGS. 2 and 3, the touch screen 190 is disposed in the center of the front surface 100a of the mobile terminal 100. The touch screen 190 may have a large size to occupy most of the front surface 100a of the mobile terminal 100. FIG. 2 illustrates an example where a main home screen is displayed on the touch screen 190. The main home screen is a first screen displayed on the touch screen 190 when power of the mobile terminal 100 is turned on. Further, when the mobile terminal 100 has several pages of different home screens, the main home screen may be a first home screen of the several home screens. Short-cut icons 191-1, 191-2, and 191-3 for executing frequently used applications, a main menu switching icon 191-4, time, weather and the like may be displayed on the home screen. A menu screen is displayed on the touch screen 190 through the main menu switching icon 191-4. At an upper end portion of the touch screen 190, a status bar 192 may be formed that indicates the status of the mobile terminal 100, such as the battery charge status, the intensity of a received signal and the current time.

The touch screen 190 has a home button 161a, a menu button 161b and a back button 161c which are arranged at a lower portion thereof.

The home button 161a causes the main home screen to be displayed on the touch screen 190. For example, when the home key 161a is touched in a state where a different home screen or the menu screen is displayed on the touch screen 190, the main home screen may be displayed on the touch screen 190. Further, when the home button 161a is touched while applications are executed on the touch screen 190, the main home screen shown in FIG. 2 may be displayed on the touch screen 190. In addition, the home button 161a may be used to display recently used applications or a task manager on the touch screen 190.

The menu button 161b provides a connection menu which may be displayed on the touch screen 190. The connection menu includes a widget addition menu, a background changing menu, a search menu, an editing menu, an environment setup menu and the like. The back button 161c may be used for displaying the screen which was executed just before the currently executed screen or terminating the most recently used application.

The first camera 151, the illumination sensor 170a, and the proximity sensor 170b may be disposed on edges of the front side 100a of the mobile terminal 100. The second camera 152, the flash 153, and the speaker 163 may be disposed on a rear surface 100c of the mobile terminal 100.

The power button 161d, the volume button 161e, a terrestrial DMB antenna 141a for broadcast reception, and one or a plurality of microphones 162 may be disposed on a side surface 100b of the mobile terminal 100. The DMB antenna 141a may be secured to the mobile terminal 100 or may be formed to be detachable from the mobile terminal 100.

Further, the mobile terminal 100 has the connector 165 arranged on a side surface of a lower end thereof. A plurality of electrodes are formed in the connector 165, and the connector 165 may be connected to an external device by a wired cable. The earphone connecting jack 167 may be formed on a side surface of an upper end of the mobile terminal 100. An earphone may be inserted into the earphone connecting jack 167.

The input unit 168 may be located on a side surface of the mobile terminal 100. The input unit 168 may be inserted into the mobile terminal 100 to be stored in the mobile terminal 100, and withdrawn and separated from the mobile terminal 100 when it is used. The input unit 168 may be a stylus pen.

In particular, according to an embodiment of the present invention, the above-configured controller 110 of the mobile terminal 100 may partition the battery into at least one logical battery, and may perform a control operation required for allocating a function or an application to the logical battery according to a user input, a function of the mobile terminal 100, or a use history of the application. Furthermore, the controller 110 may perform a control operation for displaying a residual capacity for the logical battery according to a power amount consumed by the function or the application allocated to the logical battery. Moreover, the controller 110 may perform a control operation for adjusting the partitioning and the allocation of the logical battery according to a user's use history of the mobile terminal 100 or a user's demands.

Such a controller 110 includes a logical battery managing unit 400, and performs the control operations through the logical battery managing unit 400.

Figure 4:
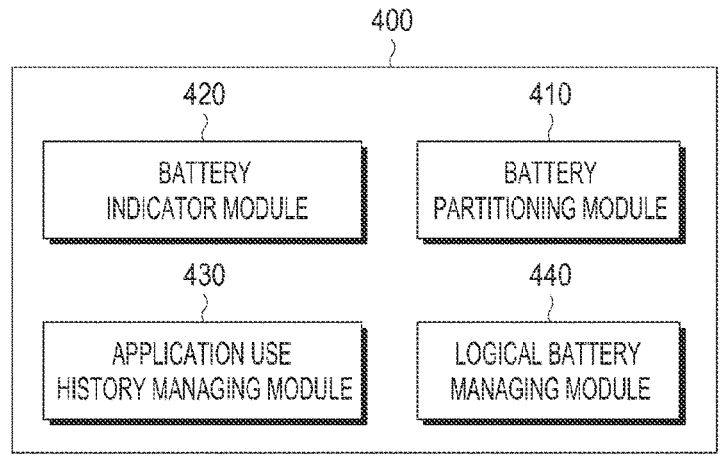
FIG. 4 is a block diagram of a configuration of a logical battery managing unit according to an embodiment of the present invention.

FIG. 4 illustrates a block diagram of configurations of a logical battery managing unit 400 according to an embodiment of the present invention. Referring to FIG. 4, the logical battery managing unit 400 includes a battery partitioning module 410, a battery indicator module 420, an application use history managing module 430, and a logical battery managing module 440.

The battery partitioning module 410 partitions a battery into at least one or more logical batteries. For example, the battery may be one or more physical batteries, and the battery partitioning module 410 partitions an entire battery capacity of the one or more physical batteries into at least one or more battery capacities, and creates virtual logical batteries with the partitioned battery capacities. At this time, the at least one or more logical batteries may include a logical battery for emergency that will be used in emergency situations or minimum logical batteries for a system that are required for a system operation of the mobile terminal 100. The logical battery for emergency use or the logical batteries for the system may be displayed such that a user cannot have access thereto. According to another embodiment, the logical battery for emergency use or the logical batteries for the system may not be included in the target for the logical battery partition and may correspond to values determined as default values within the mobile terminal 100.

Furthermore, the battery partitioning module 410 allocates functions or applications to the logical batteries, respectively, according to the user's use history of the mobile terminal 100 or the users' demands. The battery partitioning module 410 adjusts the partition of the logical batteries and the allocation of the functions or applications according to the user's use history of the mobile terminal 100 or the users' demands. For example, the battery partitioning module 410 may partition the logical batteries according to categories and may allocate the categories to the partitioned logical batteries, respectively. Also, the battery partitioning module 410 may partition the logical batteries according to applications and may allocate the applications to the partitioned logical batteries, respectively.

The battery indicator module 420 may create indicators representing the at least one or more logical batteries, respectively, and allows the functions or applications allocated to the respective logical batteries and the indicators representing a residual battery capacity of the logical batteries to be displayed on the touch screen 190.

The application use history managing module 430 stores a user's function or application use history in the storage unit 175, and manages a use history including a name of an application, a time point and an amount of time when the application has been used, and a frequency at which the application has been used. For example, the application use history managing module 430 determines which function or application is used for the longest amount of time, based on an amount of time spent using functions or applications by a user within a predetermined period of time. Furthermore, the application use history managing module 430 determines which function or application is most frequently used by a user, which function or application is used, and when the function or application is mainly used.

The logical battery managing module 440 calculates and provides a residual capacity for the logical batteries according to an amount of power consumed by the functions or applications allocated to the logical batteries. The residual capacity for the logical batteries may be displayed on the touch screen 190. For example, the logical battery managing module 440 calculates and provides a residual capacity for the logical batteries according to an amount of power consumed by the applications allocated to the respective logical batteries. In another example, the logical battery managing module 440 calculates and provides a residual capacity for the logical batteries according to power consumption for each of the categories, that is, an amount of power consumed by at least one or more applications in the corresponding category. At this time, the logical battery managing module 440 may be separately provided with an application list managing module (not illustrated) for each category, and may manage an application list for each category.

Hereinafter, operations will be specifically described in which the mobile terminal 100 provided with the logical battery managing unit 400 partitions a battery into logical batteries and allocates functions or applications to the logical batteries, respectively.

Figure 5:
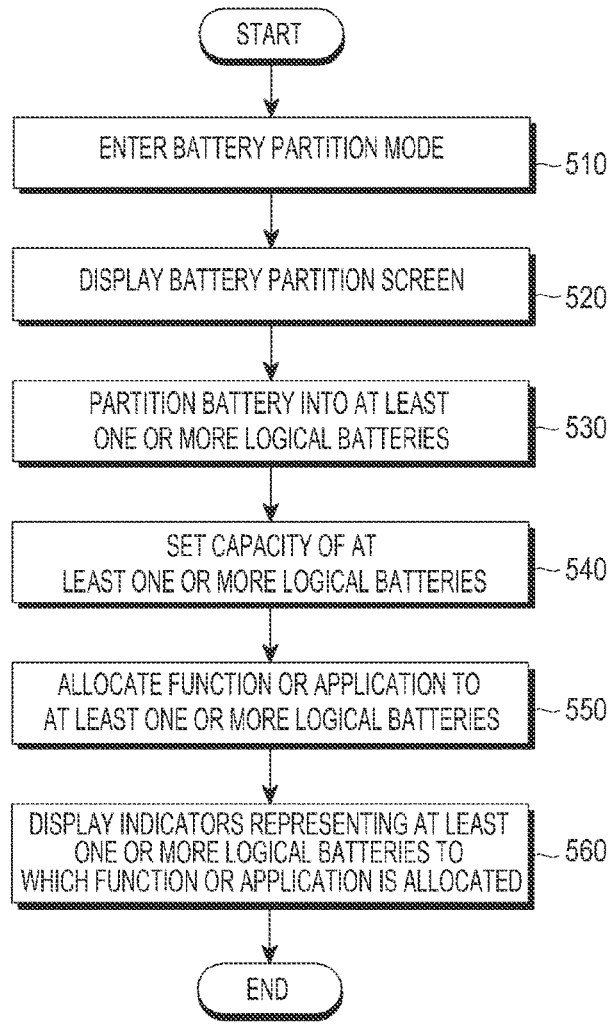
FIG. 5 is a flowchart illustrating operations of partitioning a battery into logical batteries and allocating functions or applications to the logical batteries according to an embodiment of the present invention.

FIG. 5 is a flowchart illustrating operations of partitioning a battery into logical batteries and allocating functions or applications to the logical batteries according to an embodiment of the present invention.

Referring to FIG. 5, a mobile terminal 100 enters a battery partition mode, in step 510. The mobile terminal 100 may enter the battery partition mode according to a request for partitioning a battery by a user's input such as a touch input, or may automatically enter the battery partition mode under a predetermined condition.

In step 520, the mobile terminal 100 displays a battery partition screen through a display unit such as a touch screen 190 after entering the battery partition mode. In step 530, the mobile terminal 100 partitions a battery into at least one or more logical batteries by using the battery partition screen. In step 540, the mobile terminal 100 sets a capacity of the at least one or more logical batteries.

For example, the mobile terminal 100 may represent an entire capacity of one or more physical batteries as one battery, and may create and represent at least one or more virtual logical batteries having capacities into which the entire battery capacity of the one or more physical batteries is partitioned. At this time, at least one or more logical batteries may include a logical battery for emergency that will be used in emergency situations or minimum logical batteries for a system required for a system operation of the mobile terminal 100. The logical battery for emergency use or the logical batteries for the system may be displayed such that a user cannot access these batteries. According to another embodiment, the logical battery for emergency use or the logical batteries for the system may not be included in the logical battery partition target, and may be values determined as default values within the mobile terminal 100.

Figures 6A, 6B, 6C:
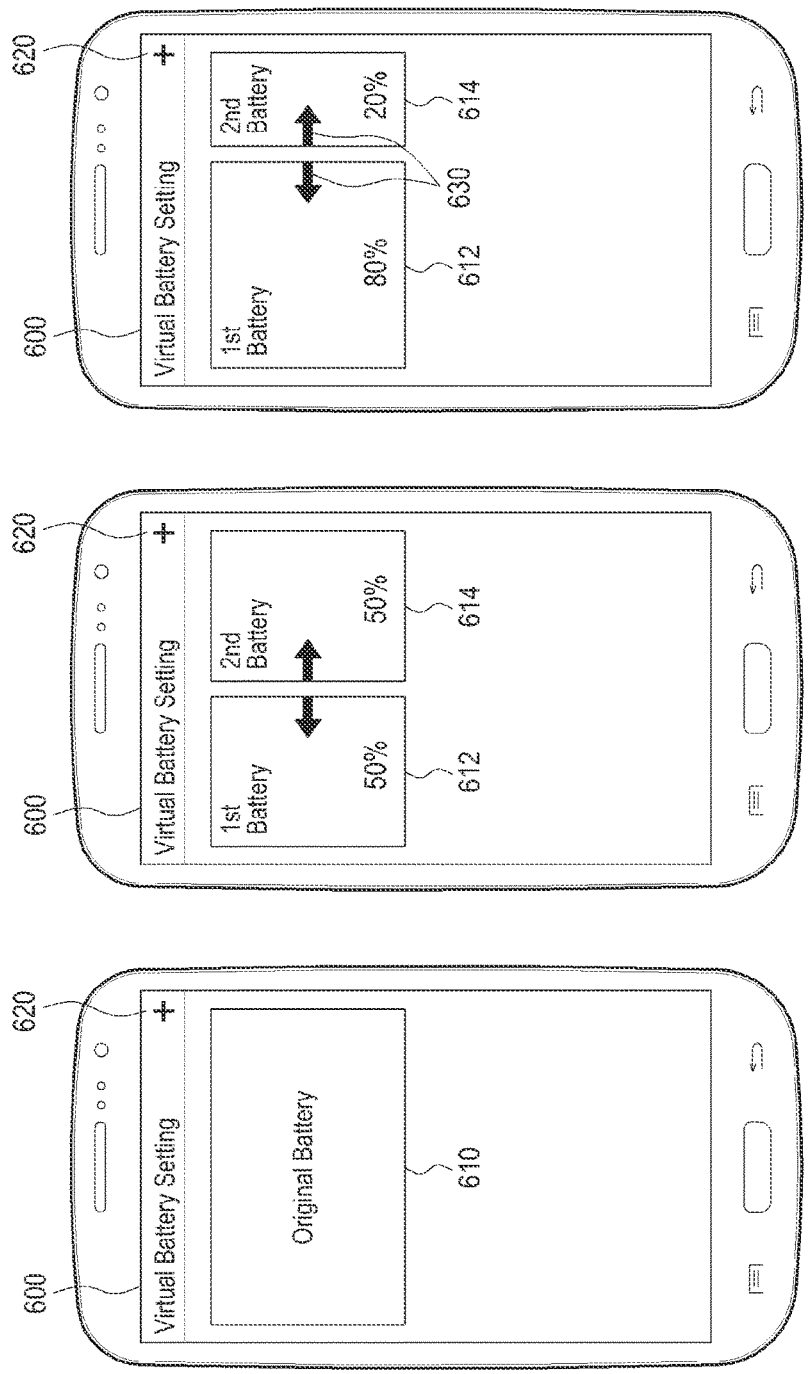
FIGS. 6A-6C illustrate an example of a logical battery partition screen according to an embodiment of the present invention.

Referring to FIG. 6 which illustrates an example of a logical battery partition screen according to an embodiment of the present invention, the mobile terminal 100 displays an original battery 610 on a battery partition screen 600 as illustrated in FIG. 6A, in which the original battery 610 represents an entire capacity of one or more physical batteries as one battery. A user may input a request for partitioning the battery by selecting a battery partition icon or button 620 while the original battery 610 is displayed. When the request for partitioning the battery is input, the mobile terminal 100 partitions the original battery 610 into a first logical battery 612 and a second logical battery 614 as illustrated in FIG. 6B. At this time, N logical batteries, including a third logical battery (not illustrated), a fourth logical battery (not illustrated), and the like may be additionally created according to the user's selection.

The mobile terminal 100 sets battery capacities of the first logical battery 612 and the second logical battery 614 by the user's selection or input as illustrated in FIG. 6C. The battery capacities may be identically partitioned in an initial stage and thereafter may be adjusted by the user's selection. For example, the user may set the battery capacities by moving a capacity adjustor 630 between the first logical battery 612 and the second logical battery 614 to allocate a greater capacity to either one of the first logical battery 612 or the second logical battery 614.

Referring back to FIG. 5, the mobile terminal 100 allocates functions or applications to the at least one or more logical batteries, respectively, in step 550. At this time, not only one function or application but also a function or application folder in which one or more functions or applications are grouped together may be allocated to the respective logical batteries.

Referring now to FIG. 7 which illustrates an example of a screen for allocation of functions or applications to logical batteries according to an embodiment of the present invention, the mobile terminal 100 displays, on the battery partition screen 600, a screen 700 for allocation of functions or applications to the at least one or more partitioned logical batteries, for example, the first logical battery 612 and the second logical battery 614.

Figures 7A, 7B:
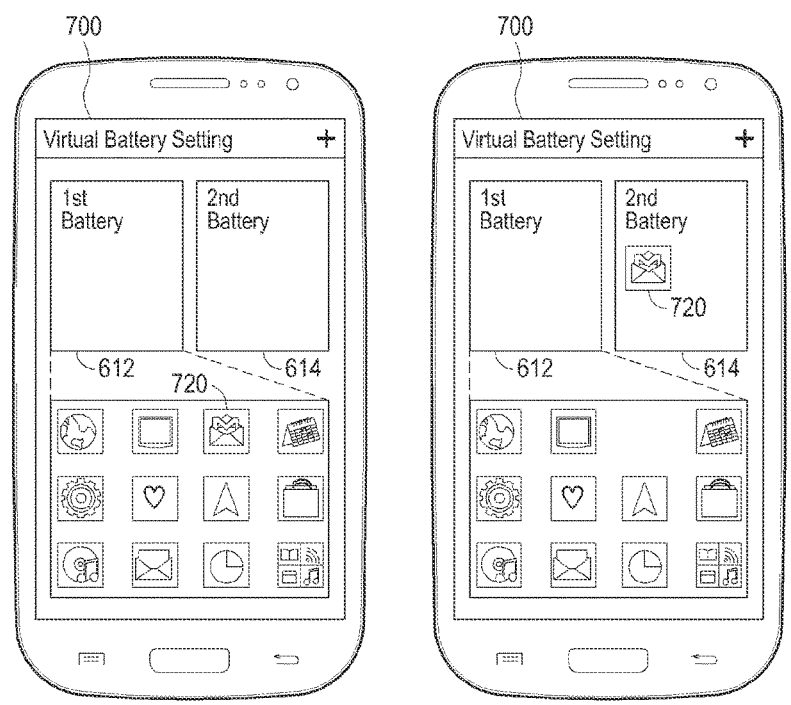
FIGS. 7A-7B illustrate an example of a screen for allocation of functions or applications to logical batteries according to an embodiment of the present invention.

Referring to FIG. 7A, one of various functions or applications, such as email, gallery, Gmail, Google, movie, studio, navigation, and the like, provided by the mobile terminal 100 may be allocated to the first logical battery 612 and the second logical battery 614. For example, when the Gmail application 720 among the various functions or applications is moved to the second logical battery 614 by a touch and drag motion of the user, the Gmail application 720 is allocated to the second logical battery 614 and the remaining functions or applications remain allocated to the first logical battery 612 as illustrated in FIG. 7B.

Meanwhile, at least one function or application other than the Gmail application 720 may also be allocated to the first logical battery 612 or the second logical battery 614.

Referring back to FIG. 5, when the functions or applications are allocated to the at least one or more logical batteries as described above, the mobile terminal 100 displays indicators representing the at least one or more logical batteries to which the functions or applications are allocated, in step 560.

FIG. 8 illustrates an example of a screen for displaying logical battery indicators according to an embodiment of the present invention. Referring to FIG. 8, the logical battery indicators may be displayed on a home screen or a status bar 192.

Figure 8A:
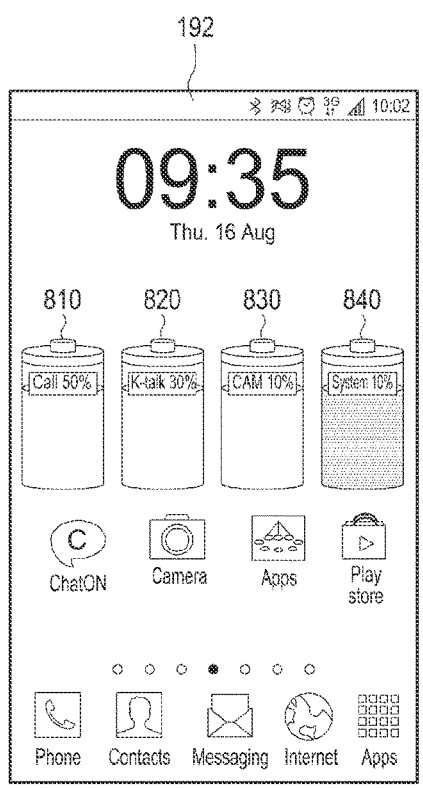
FIGS. 8A-8B illustrate an example of a screen for displaying logical battery indicators according to an embodiment of the present invention.
Figure 8B:
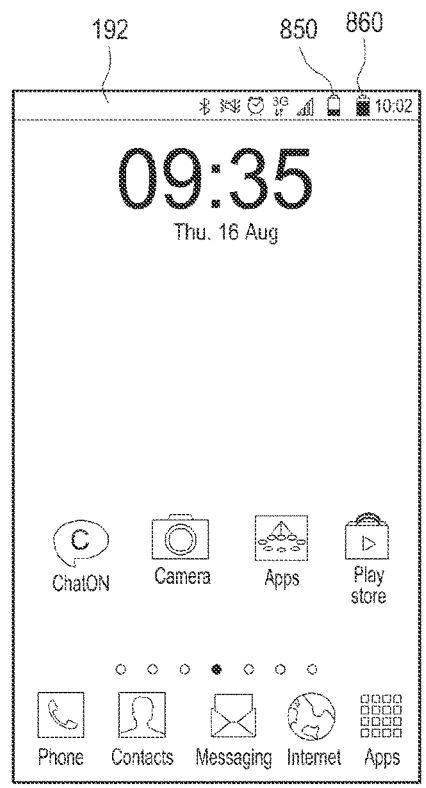

FIG. 8A illustrates the logical battery indicators displayed on the home screen. In FIG. 8A, the logical battery indicators 810 to 840 represent that an original battery (100%) is partitioned into four logical batteries having capacities of 50%, 30%, 10%, and 10%, respectively, and a call function (call), a K-talk application (K-talk), a camera function (CAM), and a system function (System) are allocated to the respective four logical batteries. At this time, since the logical battery to which the system function is allocated is created not by a user but by the mobile terminal 100, it may be impossible for the user to access the logical battery. FIG. 8B illustrates the logical battery indicators displayed on the status bar. FIG. 8B represents that two logical battery indicators 850 and 860 may be displayed on the status bar.

Meanwhile, in the above-described embodiment of the present invention, the battery is partitioned into the logical batteries and the functions or applications are allocated to the logical batteries according to the user's input. According to another embodiment of the present invention, a battery may be automatically partitioned into logical batteries and functions or applications may be allocated to the logical batteries, by using a function or application use history of the mobile terminal 100.

Figure 9:
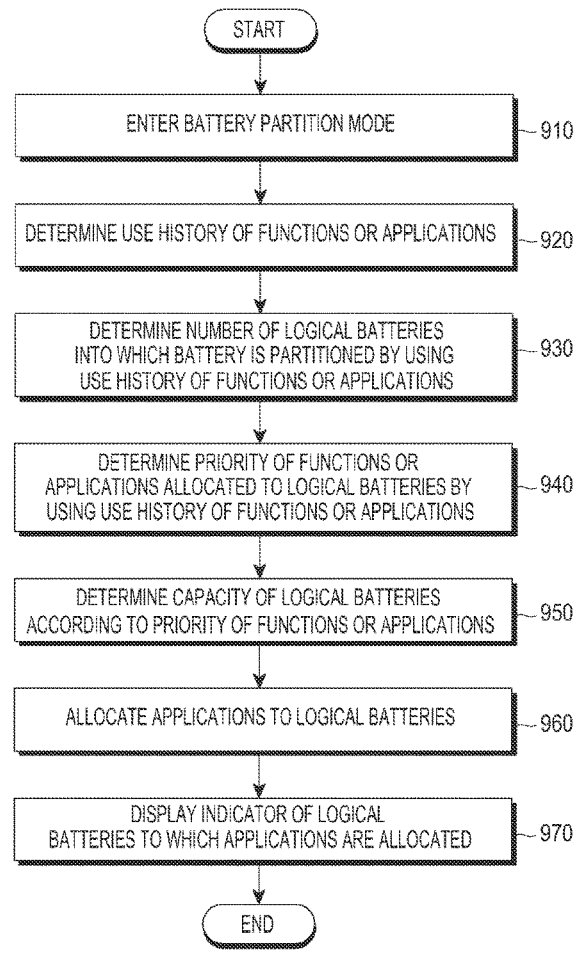
FIG. 9 is a flowchart illustrating operations of partitioning a battery into logical batteries and allocating applications to the logical batteries by using a use history of functions or applications according to an embodiment of the present invention.

FIG. 9 is a flowchart illustrating operations of partitioning a battery into logical batteries and allocating applications to the logical batteries by using a use history of functions or applications according to an embodiment of the present invention.

Referring to FIG. 9, a mobile terminal 100 enters a battery partition mode, in step 910. The mobile terminal 100 may enter the battery partition mode according to a request for partitioning a battery by a user's input such as a touch input, or may automatically enter the battery partition mode under a predetermined condition using the use history of the functions or applications.

In step 920, the mobile terminal 100 determines the use history of the functions or applications after entering the battery partition mode.

The mobile terminal 100 stores the use history of the functions or applications in a storage unit 175. For example, the mobile terminal 100 may store the use time or the use frequency of the functions or applications. More specifically, the mobile terminal 100 may store the use frequency of the functions or applications at every hour, everyday from Monday to Sunday. The use frequency may be increased by unity whenever the functions or applications are used.

The mobile terminal 100 may determine a time point and an amount of time when an application has been used and a frequency at which an application has been used, by using the use history of the functions or applications stored as described above. Furthermore, the mobile terminal 100 may determine which function or application is used the longest over a predetermined period of time. Moreover, the mobile terminal 100 may determine which function or application is most frequently used by a user. In addition, the mobile terminal 100 may determine which function or application is used and when the function or application is mainly used.

Referring now to FIGS. 10 and 11, which illustrate examples of an application use history according to an embodiment of the present invention, and in particular to FIG. 10, the mobile terminal 100 determines a ratio of use time for each function or application to use time for all functions or applications in percentages. For example, FIG. 10 illustrates a case in which it is determined that the K-talk application has a use time of 30%, the Facebook® application has a use time of 15%, a telephone function has a use time of 10%, and a game application has a use time of 5%, as compared with the use time for all the functions or applications.

In FIG. 11, the mobile terminal 100 determines when and how often all functions or applications have been used. For example, FIG. 11 illustrates a name of applications, and what time and how often the applications have been used for a week from Monday to Sunday. For example, FIG. 11 illustrates a ease in which it is determined that the K-talk application was used ten times at about 3:00 p.m. (e.g., between 2:00 p.m. and 3:00 p.m.) and twenty times at 5:00 p.m. on Monday, and the Facebook® application was used ten times at about 3:00 p.m. and twenty times at 5:00 p.m. on Monday.

Referring back to FIG. 9, in step 930, the mobile terminal 100 determines the number of logical batteries into which a battery is to be partitioned, by using the use history of the functions or application. For example, the number of logical batteries and capacities of the logical batteries may be determined depending on the number of functions or applications used for a predetermined period of time or more and use time thereof. As an example, referring to FIG. 10, since four applications including the K-talk application, the Facebook® application, the telephone application, and the game application were used for a time period corresponding to at least 5% or more of the use time of all the functions or applications, it may be determined that the number of logical batteries into which the battery is to be partitioned corresponds to 4.

Furthermore, the number of logical batteries may be determined depending on the number of functions or applications used a predetermined number of times or more. For example, the number of logical batteries may be determined depending on the number of functions or applications used at least one hundred times from Monday to Sunday. The number of logical batteries may also be determined by a number predetermined in advance by a user.

In step 940 the mobile terminal 100 determines a priority of the functions or applications which will be allocated to the logical batteries, by using the use history of the functions or applications.

For example, the mobile terminal 100 may determine the functions or applications used for the longest amount of time within the entire use time as functions or applications having the highest priority, and the functions or applications used for the shortest amount of time as functions or application having the lowest priority. As an example, in the case of FIG. 10 in which the K-talk application has been used for the longest amount of time at 30%, the Facebook® application has been used for the second longest amount of time at 15%, the telephone function has been used for the third longest amount of time at 10%, and the game application has been used for the shortest amount of time at 5%, as illustrated in FIG. 10, the mobile terminal 100 may determine the K-talk application as an application having the highest priority and the game application as an application having the lowest priority.

Furthermore, the mobile terminal 100 may determine the most frequently used functions or applications among all the functions or applications as functions or applications having the highest priority, and the least frequently used functions or applications as functions or application having the lowest priority. At this time, the mobile terminal 100 may also determine the priority of the functions or applications based on the use time and the use frequency from Monday to Sunday, namely, for a week, and more specifically, may also determine the priority of the functions or applications based on the use time and the use frequency at every hour on each day of the week.

In step 950, the mobile terminal 100 determines a capacity of the logical batteries according to the priority of the functions or applications. For example, the mobile terminal 100 determines the capacity of the logical batteries as having a larger capacity value for the functions or applications having a higher priority, and as having a smaller capacity value for the functions or applications having a lower priority. Meanwhile, the capacity of the logical batteries may be determined in advance by a user or may also be determined in advance as a default value.

In step 960, the mobile terminal 100 allocates the corresponding applications to the at least one or more logical batteries, respectively. For example, in a case in which the K-talk application has the highest priority, the Facebook® application has the second highest priority, the telephone function has the third highest priority, and the game application has the lowest priority, the mobile terminal 100 may allocate the K-talk application having the highest priority to the logical battery having the largest capacity and the game application having the lowest priority to the logical battery having the smallest capacity.

When the functions or applications are allocated to the at least one or more logical batteries according to the use history thereof as described above, the mobile terminal 100 displays indicators representing the at least one or more logical batteries to which the functions or applications are allocated, in step 970. A method of displaying the indicators representing the at least one or more logical batteries may be identical to that illustrated in FIG. 8.

According to the embodiment of the present invention, the mobile terminal 100 may display a residual capacity of the at least one or more logical batteries according to power consumed by the functions or applications allocated to the at least one or more logical batteries.

Figure 12:
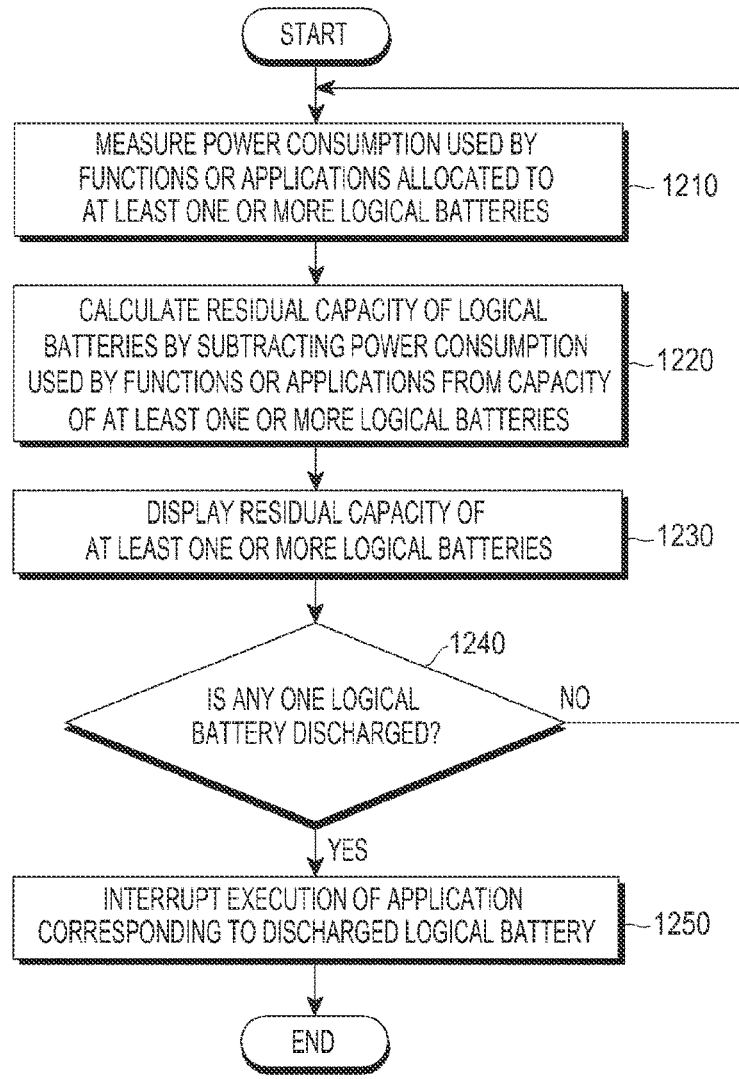
FIG. 12 is a flowchart illustrating operations of displaying a capacity of logical batteries according to an embodiment of the present invention.

FIG. 12 is a flowchart illustrating operations of displaying a capacity of logical batteries according to an embodiment of the present invention. Referring to FIG. 12, a mobile terminal 100 measures power consumption used by functions or applications allocated to at least one or more logical batteries, in step 1210.

In step 1220, the mobile terminal 100 calculates a residual capacity of each logical battery by subtracting the power consumption used by the corresponding function or application from a total capacity of each logical battery. For example, if a logical battery to which a telephone function is allocated has a capacity corresponding to 40% of an entire battery capacity, the mobile terminal 100 calculates a residual capacity by subtracting power consumption used by the telephone function from the logical battery capacity of 40%. In other words, assuming that an entire residual battery capacity is 2000 mA, a logical battery to which the telephone function is allocated has a capacity of 800 mA corresponding to 40% of the entire capacity 2000 mA, and a residual capacity of the logical battery is calculated by subtracting power consumption used by the telephone function from the capacity of 800 mA. At this time, the power consumption for each of the functions or applications may be calculated by using a mean value of the power consumption and a consumed current per second.

In step 1230, the mobile terminal 100 displays the residual capacity of the at least one or more logical batteries through the above-described calculation.

Referring now to FIG. 13, which illustrates an example of a screen on which residual capacities of logical batteries are displayed according to an embodiment of the present invention, the residual capacities of the logical batteries are displayed through logical battery indicators. The residual capacities of the logical batteries may be displayed on a home screen or a status bar 192.

Figures 13A, 13B:
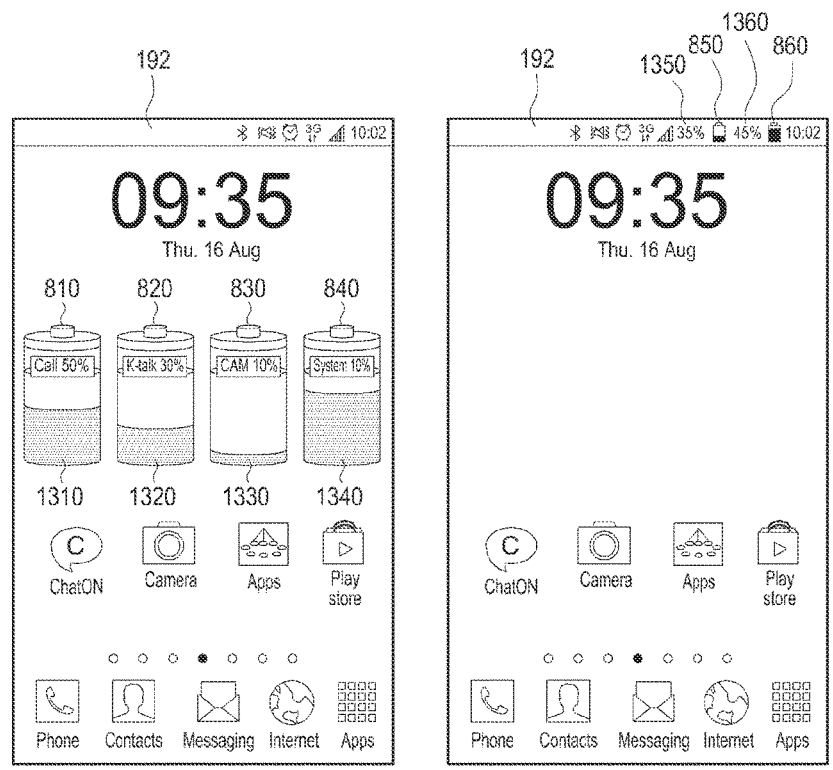
FIGS. 13A-13B illustrate an example of a screen on which residual capacities of logical batteries are displayed according to an embodiment of the present invention.

FIG. 13A illustrates the residual capacities of the logical batteries displayed on the home screen. In FIG. 13A, logical battery indicators 810 to 840 represent that an original battery is partitioned into four logical batteries having capacities of 50%, 30%, 10%, and 10%, respectively, and a call function (call), a KS-talk application (K-talk), a camera function (CAM), and a system function (System) are allocated to the respective four logical batteries. At this time, the residual capacities of the logical batteries may be displayed through a residual amount on the logical battery indicators 810 to 840 as indicated by reference numerals 1310 to 1340.

FIG. 13B illustrates the residual capacities of the logical batteries displayed on the status bar 192. FIG. 13B represents that two logical battery indicators 850 and 860 may be displayed on the status bar. At this time, the two logical battery indicators 850 and 860 may be displayed together with residual capacities (35% and 45%) 1350 and 1360, respectively. Through the residual capacity for each of the logical batteries, a user may identify how much of the logical battery capacity allocated to the corresponding function or application is left.

Referring to FIG. 12, the mobile terminal 100 displays the battery residual capacities as described above, and determines in step 1240 whether any one of the at least one or more logical batteries is discharged. If none are discharged, the mobile terminal returns to step 1210.

If any one of the logical batteries is discharged, the mobile terminal 100 interrupts the function or application corresponding to the discharged logical battery, in step 1250. For example, even though a user requests execution of the function or application corresponding to the discharged logical battery, the mobile terminal 100 does not execute the corresponding function or application.

When any one logical battery has been discharged, the mobile terminal 100 may allow a telephone function rather than an idle screen to be executed as a default in order to reduce power consumption of the battery. According to another embodiment, when any one logical battery has been discharged, the mobile terminal 100 may partition again the battery into logical batteries based on the entire residual capacity of the battery at the time of the discharge, and may also reallocate the residual capacity of the logical batteries. For example, in a case in which a logical battery for a telephone function is set to have a capacity corresponding to 40% of the entire battery capacity, if the capacity of 40% is completely consumed, the mobile terminal 100 may calculate again the logical battery capacity for the telephone function as 40% based on the entire battery residual capacity, and may reallocate the calculated capacity to the logical battery.

Meanwhile, according to an embodiment of the present invention, the mobile terminal 100 may adjust the at least one or more logical batteries when the logical batteries need to be adjusted.

Figure 14:
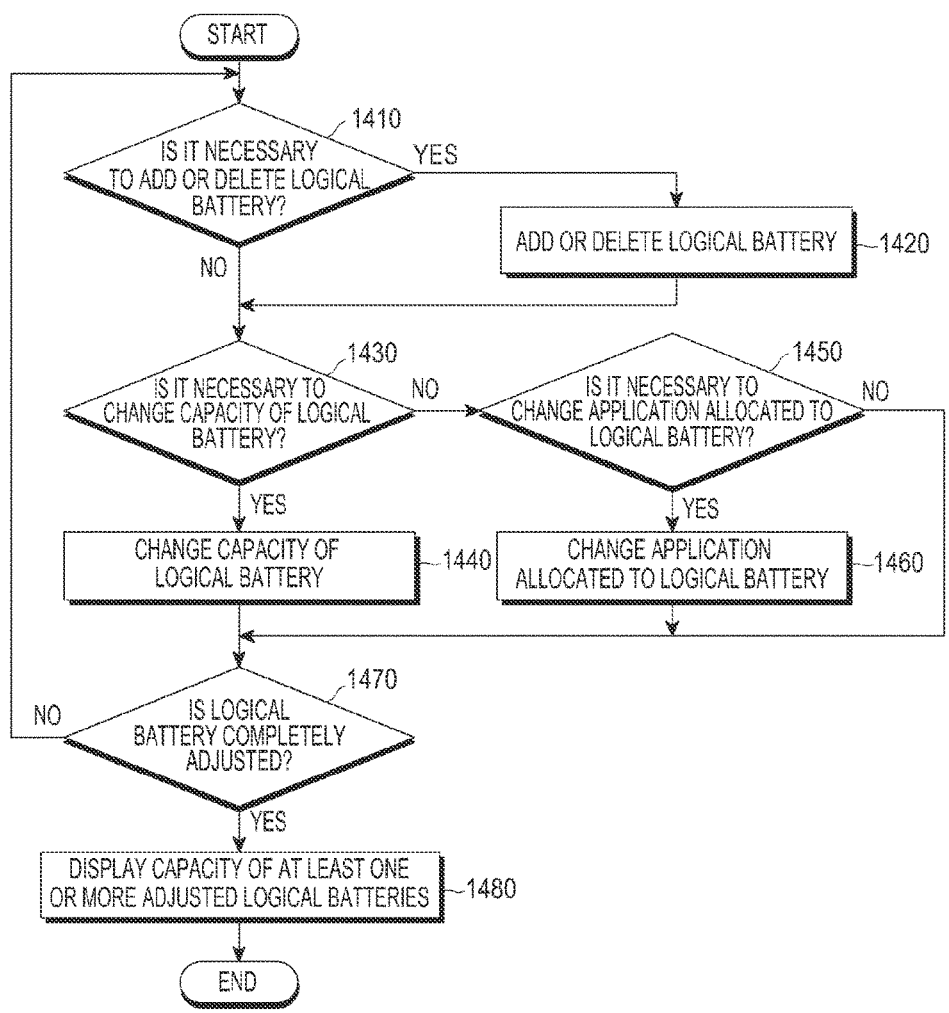
FIG. 14 is a flowchart illustrating operations of adjusting a logical battery according to an embodiment of the present invention.

FIG. 14 is a flowchart illustrating operations of adjusting a logical battery according to an embodiment of the present invention. Referring to FIG. 14, a mobile terminal 100 determines whether a logical battery needs to be added or deleted in step 1410. The mobile terminal 100 determines whether a user inputs a request for adding or deleting a logical battery or whether a logical battery needs to be added or deleted according to a use history of functions or applications. In step 1420, the mobile terminal 100 adds or deletes the logical battery according to the need of adding or deleting the logical battery.

In step 1430, the mobile terminal 100 determines whether it is necessary to change a capacity of a logical battery. The mobile terminal 100 may determine whether a user inputs a request for changing the capacity of the logical battery or whether it necessary to change the capacity of the logical battery according to the use history of functions or applications. In step 1440, the mobile terminal 100 changes the capacity of the logical battery according to the need of changing the capacity of the logical battery.

In step 1450, the mobile terminal 100 determines whether it is necessary to change an application allocated to a logical battery. The mobile terminal 100 may determine whether a user inputs a request for changing the application allocated to the logical battery or whether it necessary to change the application allocated to the logical battery according to the use history of the application. In step 1460, the mobile terminal 100 changes the application allocated to the logical battery according to the need for changing the application allocated to the logical battery. For example, if a user desires to additionally allocate a Social Network Service (SNS) function to an existing logical battery while a telephone function is allocated to the existing logical battery, the SNS function may be additionally allocated to the corresponding logical battery together with the telephone function.

Figure 15:
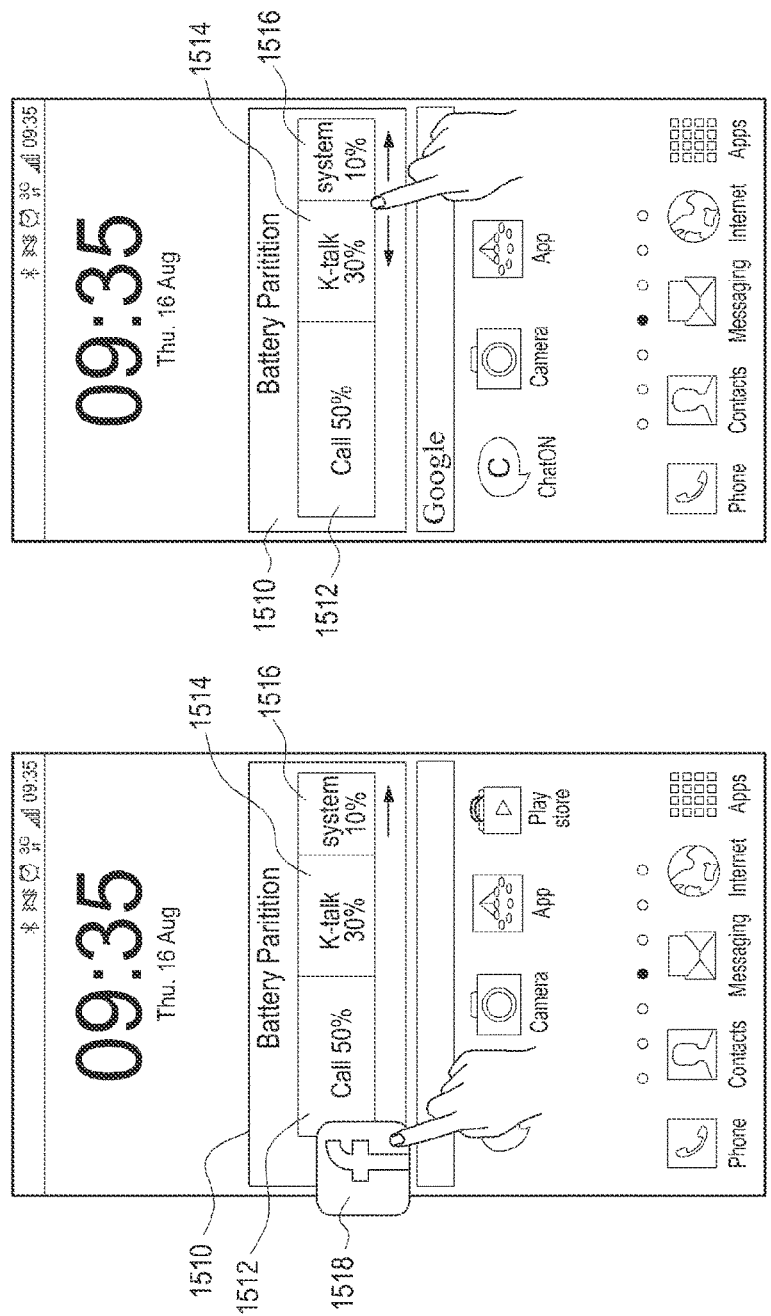
FIGS. 15A-15B illustrate an example of a logical battery adjustment screen according to an embodiment of the present invention.

Referring now to FIG. 15, which illustrates an example of a logical battery adjustment screen according to an embodiment of the present invention, and in particular to FIG. 15A, while a battery is partitioned into logical batteries 1510 including a logical battery "Call 50%" 1512, a logical battery "K-talk 30%" 1514, and a logical battery "System 10%" 1516, the mobile terminal 100 may add a logical battery to allocate another application 1518 to the logical batteries 1510. At this time, if a user touches and drags an icon of the another application 1518 and drops the icon onto the logical batteries 1510, a logical battery to which the another application 1518 is allocated may be added.

Referring to FIG. 15B, while a battery is partitioned into logical batteries 1510 including a logical battery "Call 50%" 1512, a logical battery "K-talk 30%" 1514, and a logical battery "System 10%" 1516, if a user slides a boundary between the logical batteries 1510, capacities of the logical batteries 1510 may be changed. For example, when there is a user input for sliding a boundary between the logical battery "K-talk 30%" 1514 and the logical battery "System 10%" 1516 toward the logical battery "K-talk 30%" 1514, a capacity of the logical battery "System 10%" 1516 may be increased and a capacity of the logical battery "K-talk 30%" 1514 may be decreased.

Referring back to FIG. 14, when it is determined in step 1470 that the logical battery is completely adjusted, the mobile terminal 100 may display the capacity of at least one or more adjusted logical batteries, in step 1480.

Meanwhile, according to various embodiments of the present invention, the mobile terminal 100 may set a category including at least one application to be allocated to the at least one or more logical batteries, or may set one application to be allocated to the at least one or more logical batteries.

Figure 16:
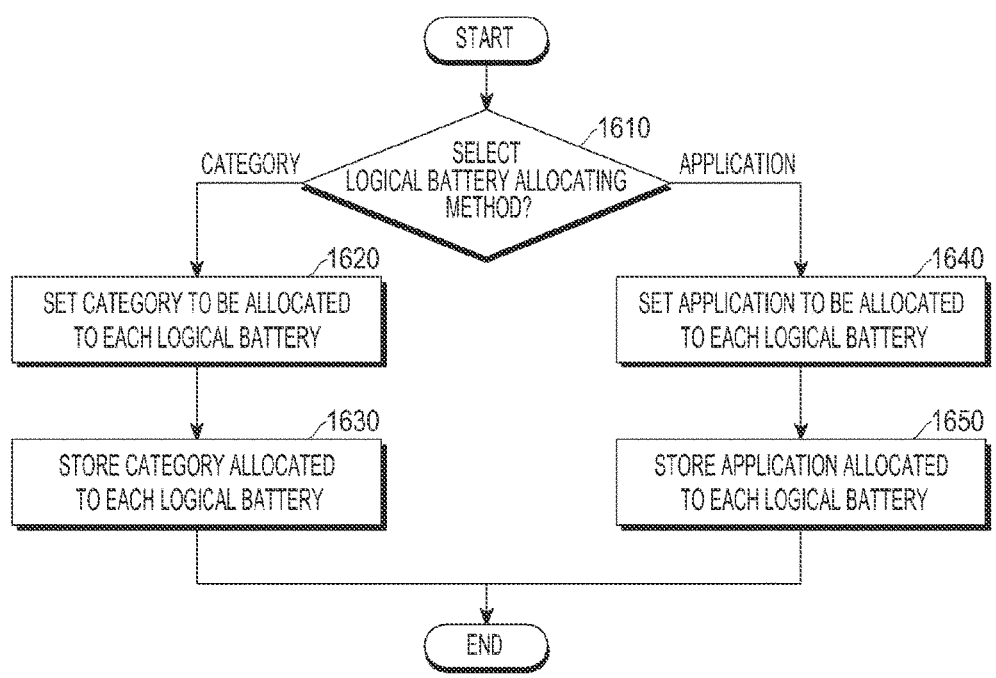
FIG. 16 is a flowchart illustrating operations of allocating at least one application to logical batteries according to an embodiment of the present invention.

FIG. 16 is a flowchart illustrating operations of allocating at least one application to logical batteries according to an embodiment of the present invention, and FIG. 17 illustrates screens for allocating a category and an application, respectively, to logical batteries according to an embodiment of the present invention.

Referring to FIGS. 16 and 17, a mobile terminal 100 selects whether a category or an application is allocated to logical batteries, in step 1610. At this time, a category may be set in advance to be allocated to the logical batteries, or an application may be set in advance to be allocated to the logical batteries, without the selection as to whether the category or the application is allocated to the logical batteries.

Figures 17A, 17B:
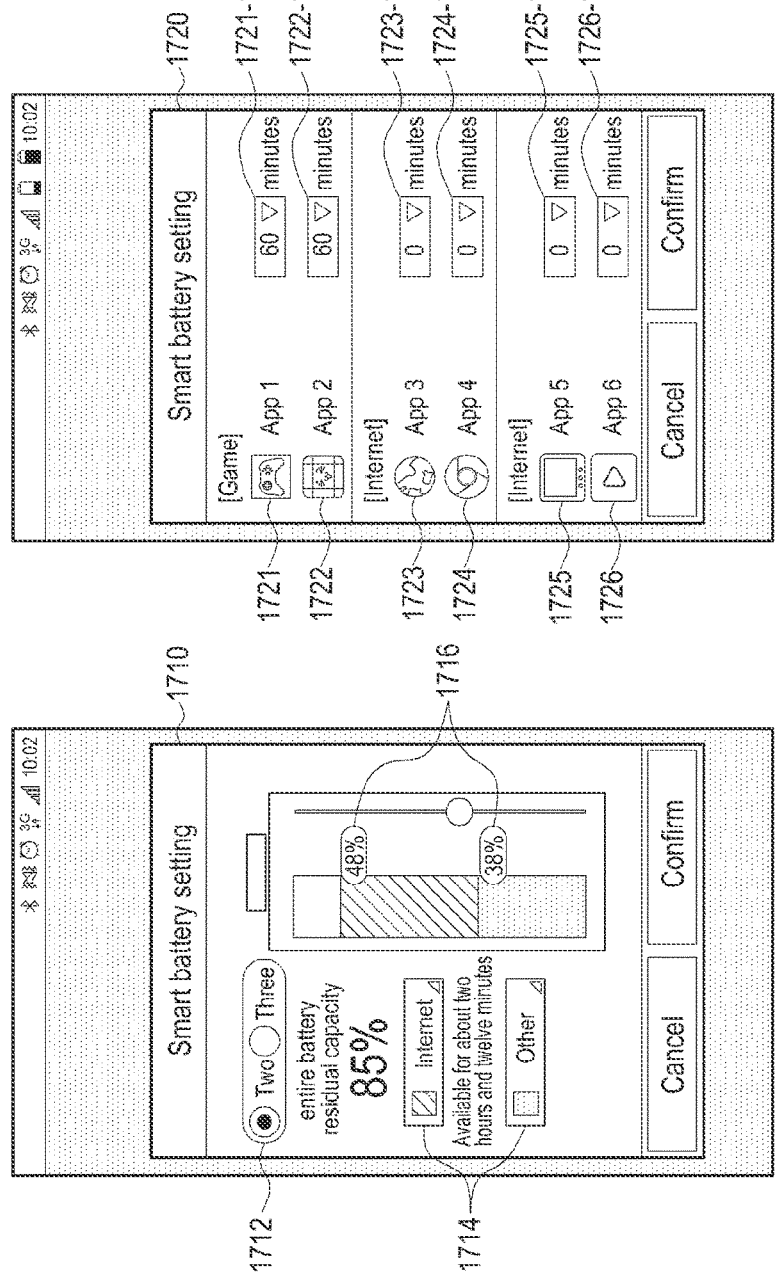
FIGS. 17A-17B illustrate screens for allocating a category and an application, respectively, to logical batteries according to an embodiment of the present invention.

When the method for allocating the category to the logical batteries is selected, the mobile terminal 100 sets a category that will be allocated to each of the logical batteries, in step 1620. For example, as illustrated in FIG. 17A, the mobile terminal 100 sets the number of categories 1712, types of categories 1714, and logical battery capacities for the respective categories 1716 on a logical battery setting screen 1710. Specifically, the mobile terminal 100 may set the number of categories 1712 to two, the two types of categories to an Internet category and another category, a logical battery capacity for the Internet category to 48%, and a logical battery capacity for the another category to 38%. At this time, the Internet category may include at least one or more applications related to the Internet, and the another category may include at least one or more other applications. When the category which will be allocated to each of the logical batteries is set, the mobile terminal 100 stores the category to be allocated to the logical category, in step 1630.

When the method for allocating the application to the logical batteries is selected, the mobile terminal 100 sets an application that will be allocated to each of the logical batteries, in step 1640. For example, as illustrated in FIG. 17B, the mobile terminal 100 may set applications that will be allocated to each logical battery, by selecting use times 1721-1 to 1726-1 for at least one or more applications 1721 to 1726 contained in each category on a logical battery setting screen 1720. Specifically, for example, when use time of 60 minutes (1721-1) is selected for App 1 (1721), the App 1 may be set to be allocated to a logical battery having power to be consumed by the App 1 for 60 minutes. When the application which will be allocated to each logical battery is set, the mobile terminal 100 stores the application to be allocated to the logical category, in step 1650.

According to the above-described embodiment of the present invention, a user may use each logical battery for one application, or may use each logical battery for a plurality of applications corresponding to the same category.

According to various embodiments of the present invention, when at least one or more applications are allocated to at least one or more logical batteries, the mobile terminal 100 may not display on a home screen or may deactivate icons corresponding to applications that are not allocated to the at least one or more logical batteries.

Figure 18:
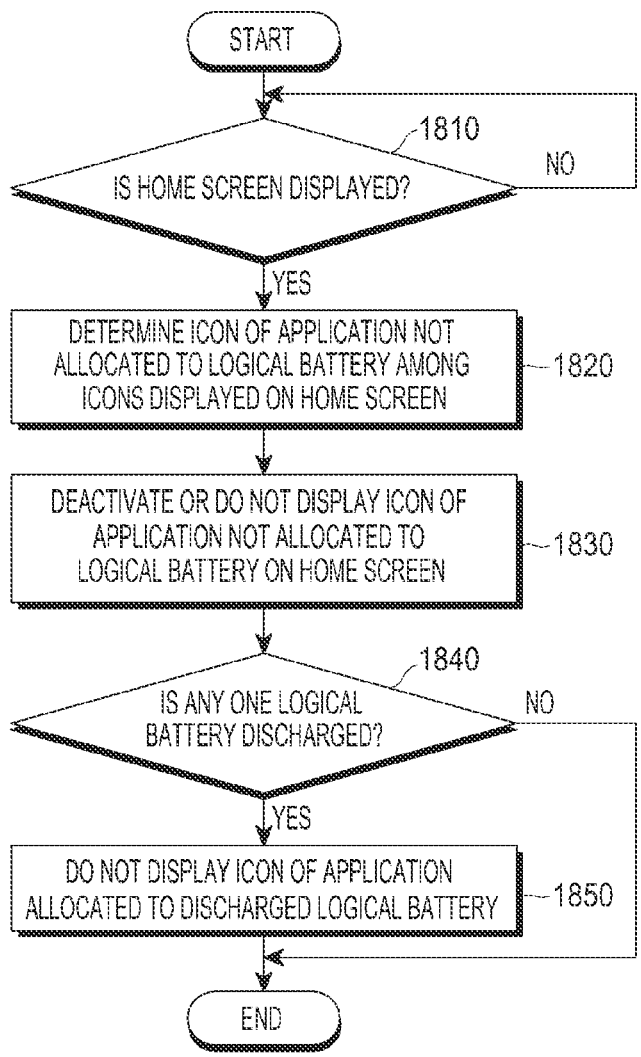
FIG. 18 is a flowchart illustrating operations of displaying application icons on a home screen according to an embodiment of the present invention.

FIG. 18 is a flowchart illustrating operations of displaying application icons on a home screen according to an embodiment of the present invention, and FIG. 19 illustrates examples of a home screen according to embodiments of the present invention.

Figure 19C:
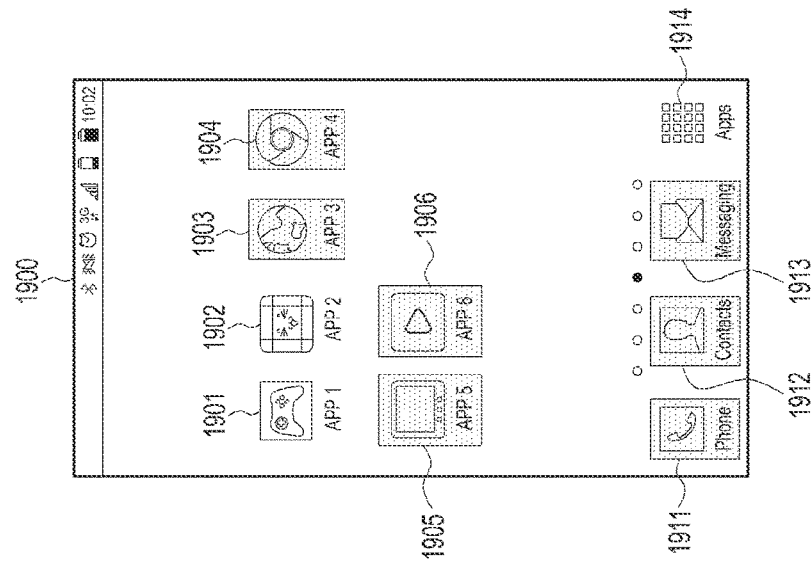
FIGS. 19A-19C illustrates examples of a home screen according to embodiments of the present invention.
Figure 19B:
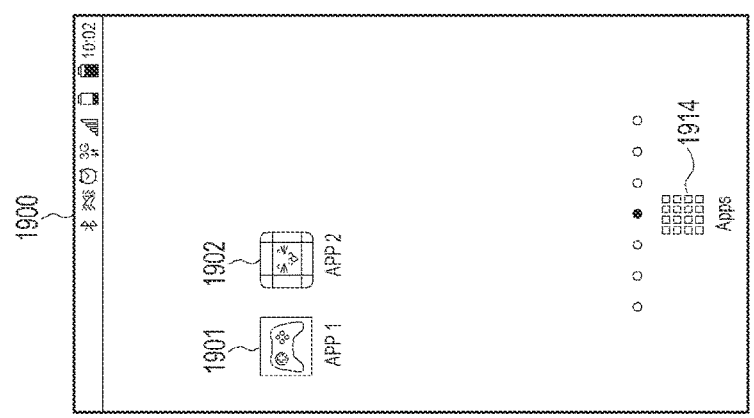
Figure 19A:
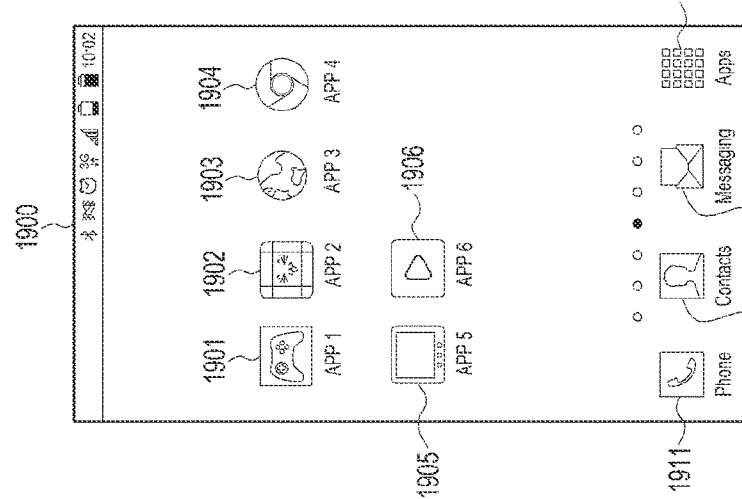

Referring to FIGS. 18 and 19, a mobile terminal 100 determines whether a home screen is to be displayed, in step 1810. The home screen may be a main home screen. The main home screen is a first screen displayed on the touch screen 190 when the mobile terminal 100 is turned on. Further, when the mobile terminal 100 has several pages of different home screens, the main home screen may be a first home screen of the several pages of home screens. For example, as illustrated in FIG. 19A, the mobile terminal 10 displays, on the home screen, short-cut icons 1901, 1902, 1903, 1904, 1905, and 1906 for executing first to sixth applications App 1 to App 6, respectively, which are frequently used, and icons such as a telephone icon 1911, a contacts icon 1912, a message icon 1913, and main menu switching icon 1914.

When the home screen is displayed, the mobile terminal 100 determines which icons correspond to applications that are not allocated to logical batteries, among the icons displayed on the home screen, in step 1820. In step 1830, the mobile terminal 100 does not display or deactivates the icons of the applications that are not allocated to the logical batteries, among the icons displayed on the home screen.

For example, among the short-cut icons 1901 to 1906 for executing the first to sixth applications App 1 to App 6, the telephone icon 1911, the contacts icon 1912, the message icon 1913, and the main menu switching icon 1914, the short-cut icons 1903 to 1906, the telephone icon 1911, the contacts icon 1912, and the message icon 1913 may correspond to icons of applications that are not allocated to the logical batteries. In this case, the mobile terminal 100 does not display, on the home screen, the short-cut icons 1903 to 1906, the telephone icon 1911, the contacts icon 1912, and the message icon 1913 as illustrated in FIG. 19B, or deactivates the short-cut icons 1903 to 1906, the telephone icon 1911, the contacts icon 1912, and the message icon 1913 on the home screen (e.g., displays them in a locking state) as illustrated in FIG. 19C by the shaded areas over each icon.

Furthermore, in step 1840, the mobile terminal 100 determines whether any one of the logical batteries is discharged while the home screen is being displayed. When any one of the logical batteries is discharged while the home screen is being displayed, the mobile terminal 100 performs a control such that an icon of an application allocated to the discharged logical battery is not displayed or is deactivated, in step 1850. For example, whenever at least one or more logical batteries are discharged, the mobile terminal 100 does not display or deactivates icons of applications allocated to the discharged logical batteries. Accordingly, the icons of the corresponding applications may not be displayed or may be deactivated in an order in which the at least one or more logical batteries are discharged.

According to the above-described embodiment of the present invention, the mobile terminal 100 may restrict usage of the applications which are not allocated to the logical batteries, by deactivating or not displaying the icons of the applications which are not allocated to the logical batteries among the icons displayed on the home screen.

Meanwhile, according to various embodiments of the present invention, the mobile terminal 100 may display an alert message and may interrupt a corresponding function when any one or all of the at least one or more logical batteries are discharged.

Figure 20:
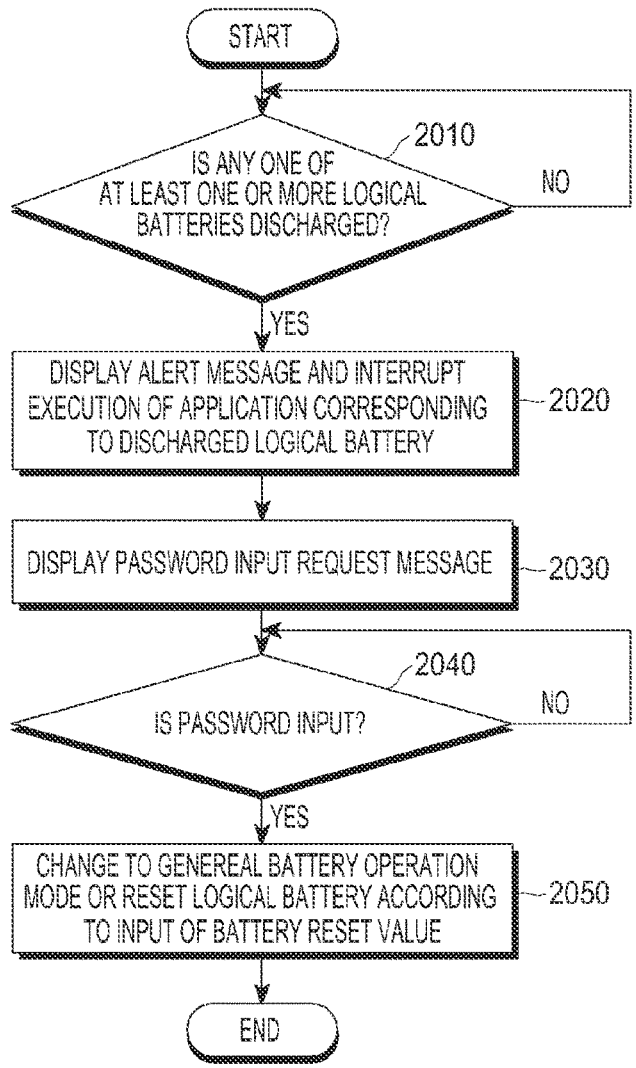
FIG. 20 is a flowchart illustrating operations when at least one or more logical batteries are discharged according to an embodiment of the present invention.

FIG. 20 is a flowchart illustrating operations when at least one or more logical batteries are discharged according to an embodiment of the present invention, and FIGS. 21 and 22 illustrate examples of a screen when at least one or more logical batteries are discharged according to an embodiment of the present invention.

Referring to FIG. 20, a mobile terminal 100 determines whether any one of at least one or more logical batteries is discharged in step 2010. When it is determined that any one logical battery has been discharged, the mobile terminal 100 displays an alert message and interrupts execution of an application corresponding to the discharged logical battery, in step 2020. For example, when any one of the at least one or more logical batteries has been discharged, the mobile terminal 100 displays the alert message informing the user that any one logical battery has been discharged, and interrupts the execution of the application corresponding to the discharged logical battery. Furthermore, when all of the logical batteries have been discharged, the mobile terminal 100 displays an alert message informing the user that all of the logical batteries have been discharged, and interrupts execution of all applications allocated to the at least one or more logical batteries.

In step 2030, the mobile terminal 100 displays a password input request message. For example, the mobile terminal 100 may display the password input request message together with the alert message or after displaying the alert message. In step 2040, the mobile terminal 100 determines whether a password is input in response to the password input request message. When a user inputs the password, the mobile terminal 100 changes from a logical battery operation mode to a general battery operation mode, or resets the logical batteries in step 2050.

Figures 21A, 21B:
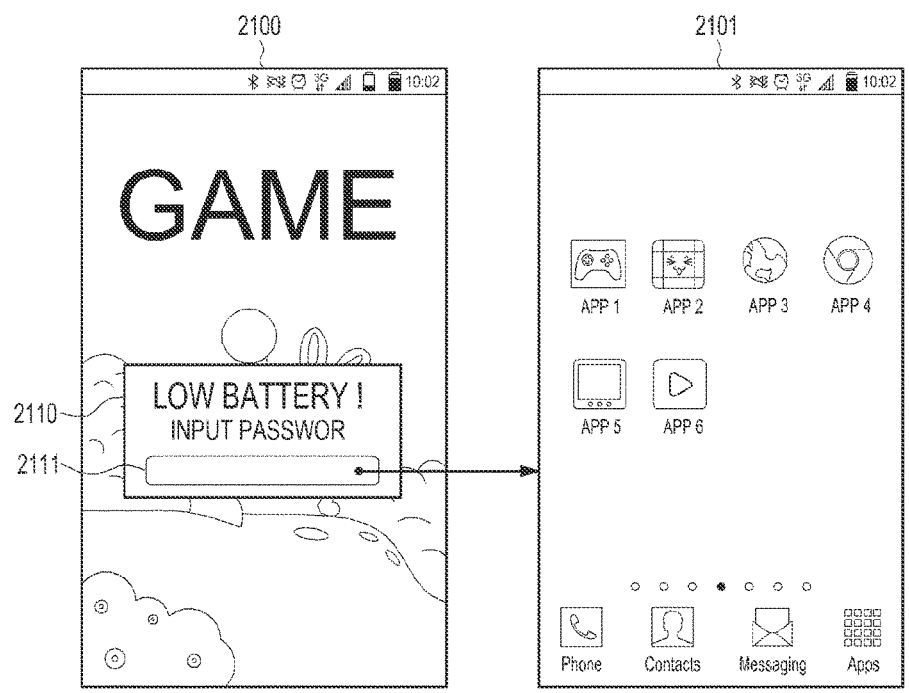

For example, referring to FIG. 21, when a logical battery to which a game application is allocated is discharged during execution of the game application 2100, the mobile terminal 100 displays an alert message 2110 containing a password input request message 2111, as illustrated in FIG. 21A. When a password is input, the mobile terminal 100 changes from the logical battery operation mode to the general battery operation mode, and displays a normal screen according to the general battery operation mode, for example a home screen 2101, as illustrated in FIG. 21B. In the general battery operation mode, the mobile terminal may operate, recognizing the entire capacity of one or more physical batteries as an original battery.

Furthermore, referring to FIG. 22, when a logical battery to which a game application is allocated is discharged during execution of the game application 2200, the mobile terminal 100 displays an alert message 2210 as illustrated in FIG. 22A. The mobile terminal 100 displays a logical battery setting screen 2201 and a password input request message 2220 for resetting the logical batteries as illustrated in FIG. 22B, after displaying the alert message 2210. When a password is input in response to the password input request message 2220 for resetting the logical batteries, the mobile terminal 100 resets the logical batteries according to a user input. When the logical batteries are completely reset, the mobile terminal 100 displays a normal screen according to the resetting of the logical batteries, for example a home screen 2202, as illustrated in FIG. 22C.

According to the above-described embodiment of the present invention, when a logical battery is discharged, the mobile terminal may interrupt the execution of the application corresponding to the discharged logical battery, thereby restricting the use of the application such that the application may be used only for a time period corresponding to the capacity of the logical battery. For example, in a case in which a game application is allocated to any one of the logical batteries, if the logical battery is completely consumed, the mobile terminal interrupts execution of the game application, thereby restricting the use of the game application such that the game application may be used only for a time period corresponding to the predetermined capacity of the logical battery.

Meanwhile, according to various embodiments of the present invention, the mobile terminal 100 may reset the logical battery through a logical battery resetting menu according to a user's request irrespective of a discharge of the logical battery.

Figures 23A, 23B:
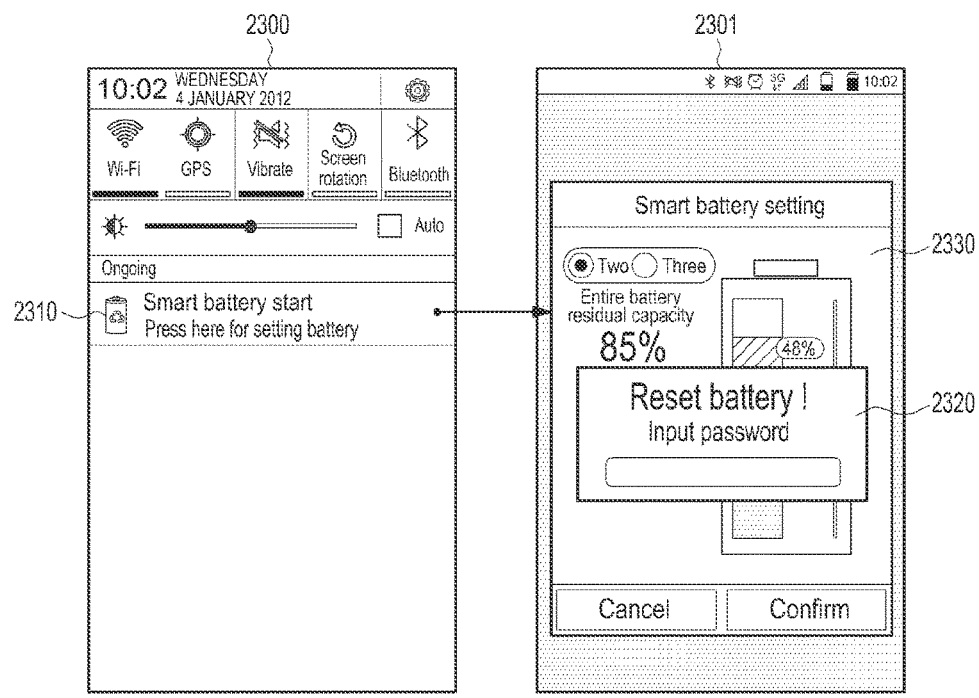
FIGS. 23A-23B illustrate a logical battery resetting screen according to an embodiment of the present invention.

FIG. 23 illustrates a logical battery resetting screen according to an embodiment of the present invention. Referring to FIG. 23, a mobile terminal 100 displays a logical batter setting menu 2310, for example, a smart battery start menu on a setting screen 2300 as illustrated in FIG. 23A. The setting menu may include other setting menus, for example, a Wi-Fi setting menu, a GPS setting menu, a vibration setting menu, and the like, in addition to the logical battery setting menu 2310. When a user selects the logical battery setting menu 2310, the mobile terminal 100 displays a logical battery setting screen 2301 and a password input request message 2320 for resetting logical batteries, as illustrated in FIG. 23B. When a password is input in response to the password input request message 2320 for resetting the logical batteries, the mobile terminal 100 resets the logical batteries according to a user input through logical battery setting items 2330.

Figure 24:
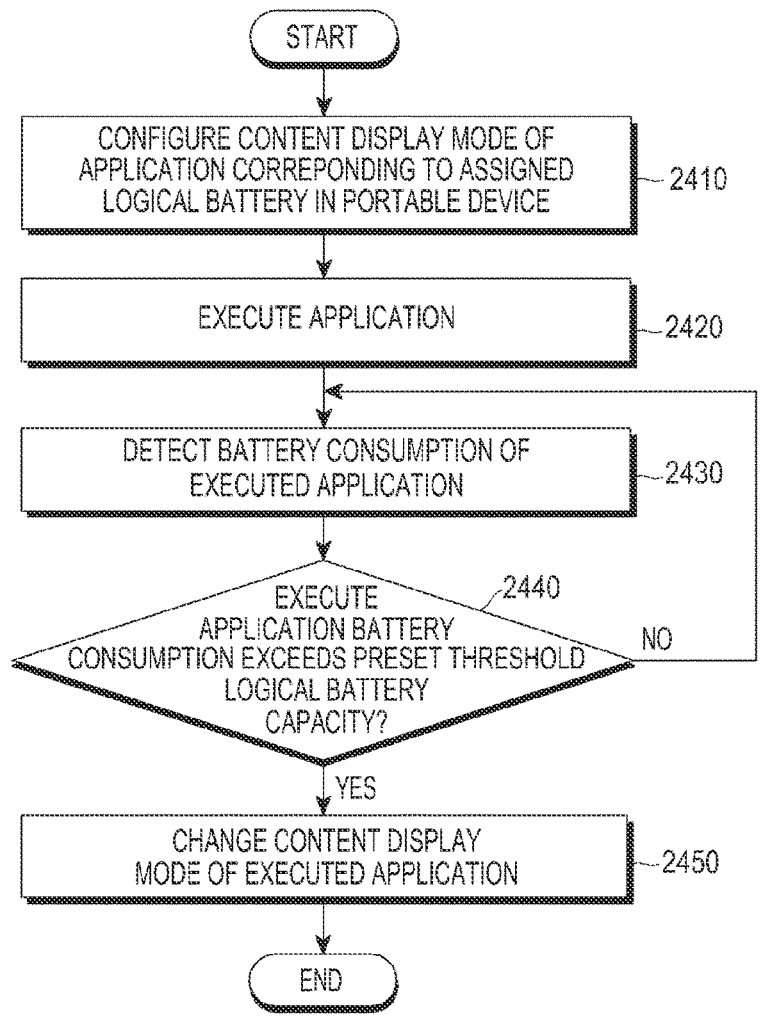
FIG. 24 is a flowchart illustrating a content display method of an electronic device according to an embodiment of the present invention.

FIG. 24 is a flowchart illustrating a content display method of an electronic device according to an embodiment of the present invention.

Figure 26A:
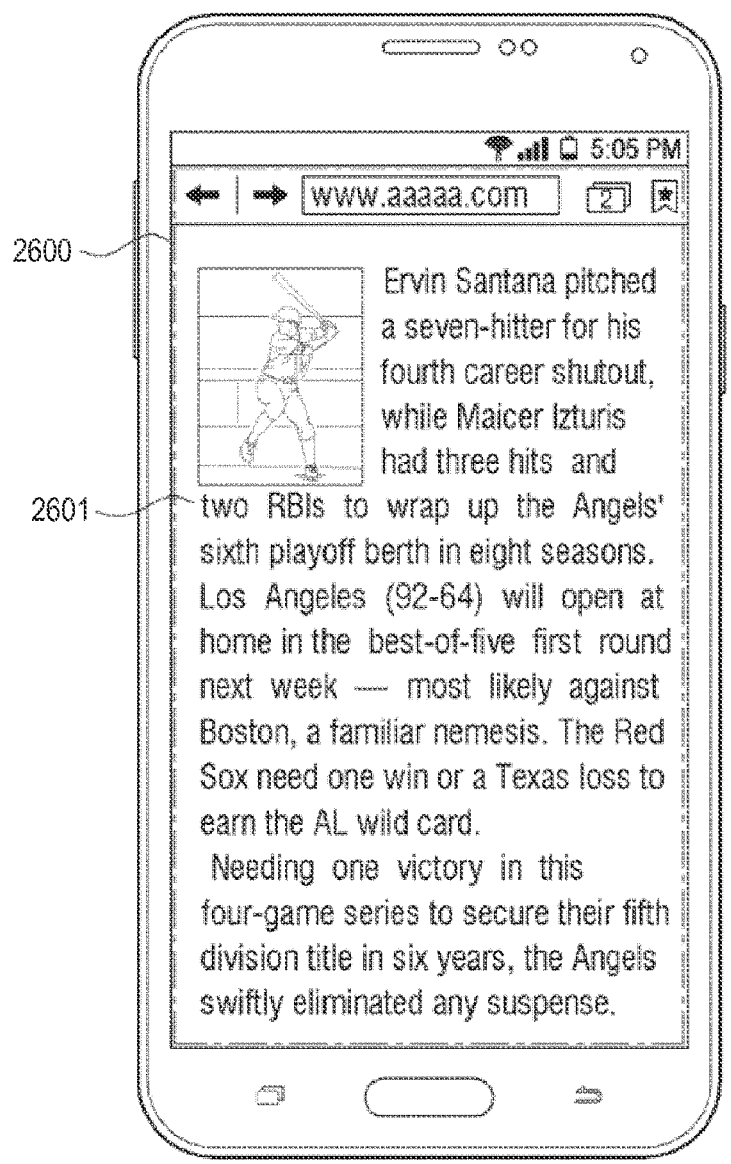
FIGS. 26A to 26C illustrate examples of a screen of an electronic device according to an embodiment of the present invention.
Figure 26B:
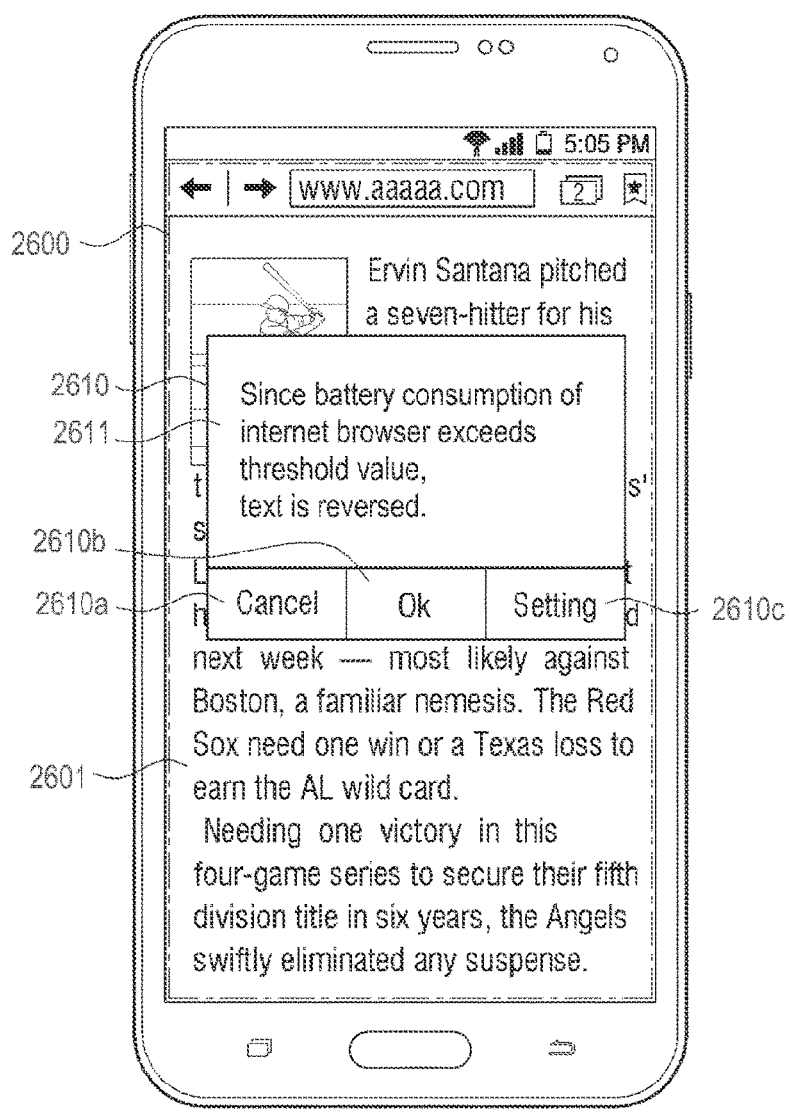
Figure 26C:
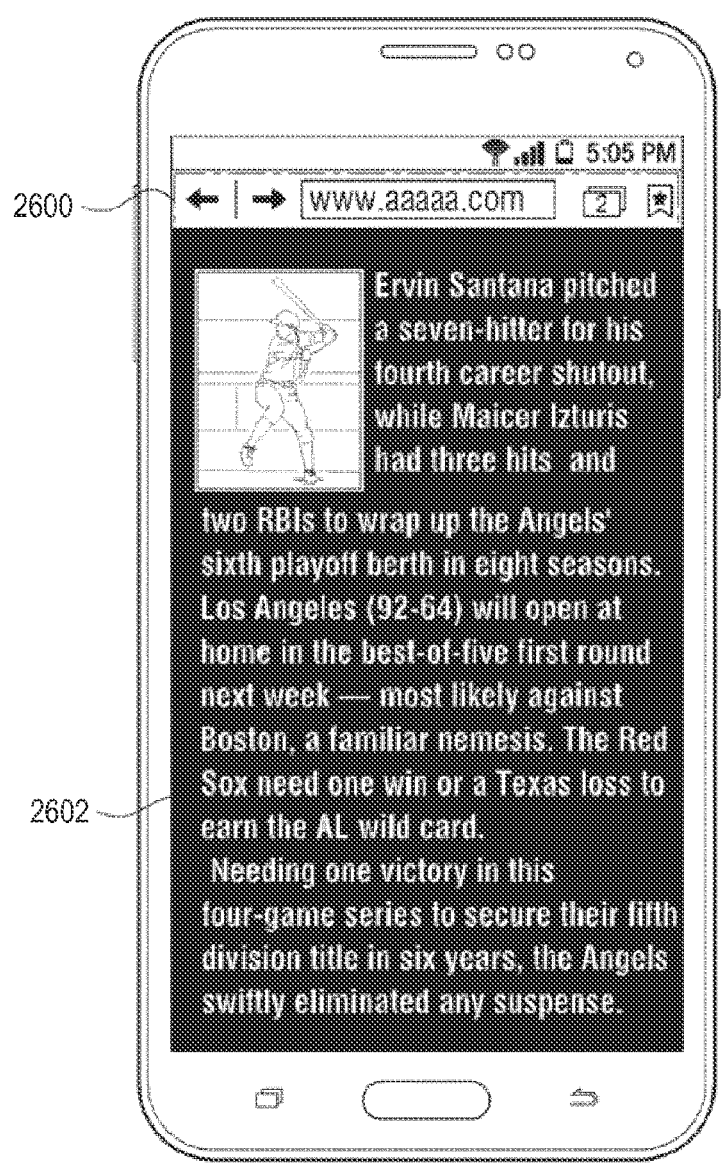
Figure 26D:
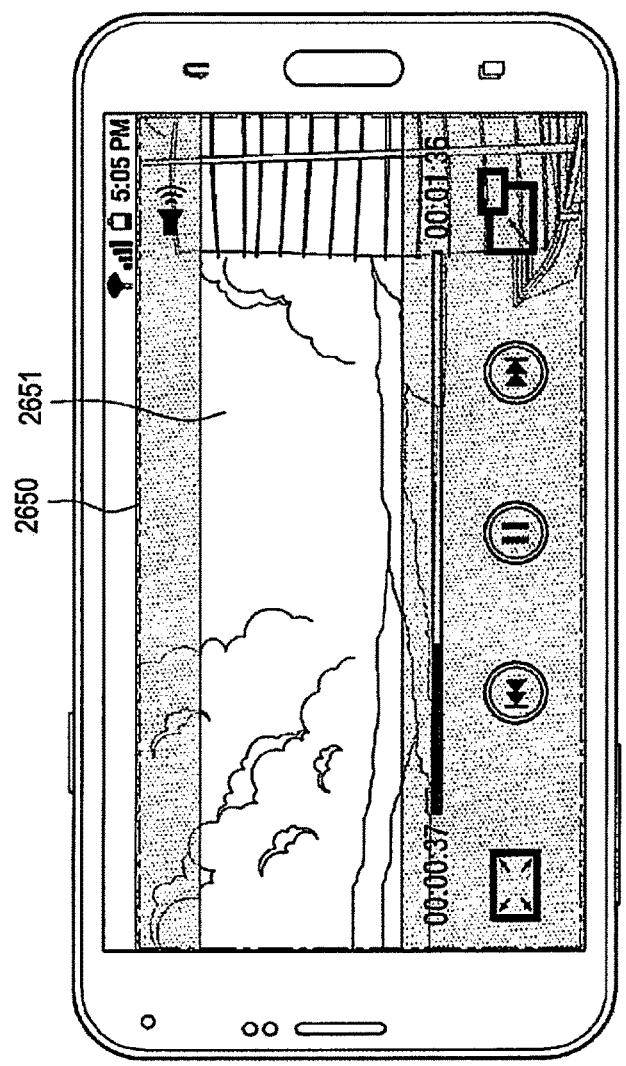
FIGS. 26D to 26F illustrate examples of a screen of an electronic device according to another embodiment of the present invention.
Figure 26E:
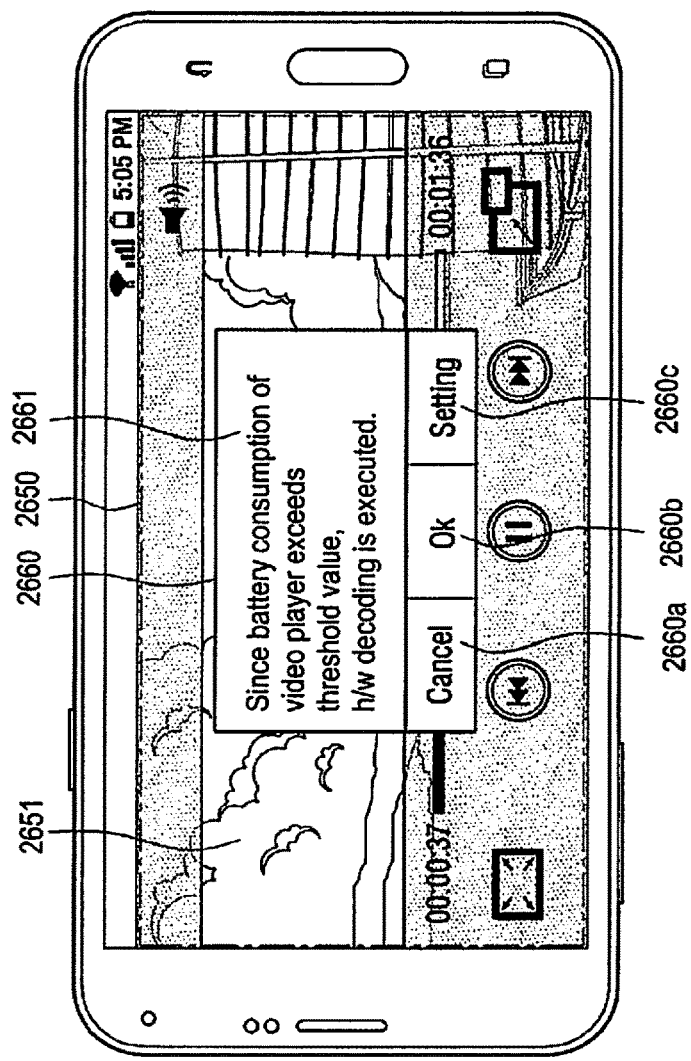
Figure 26F:
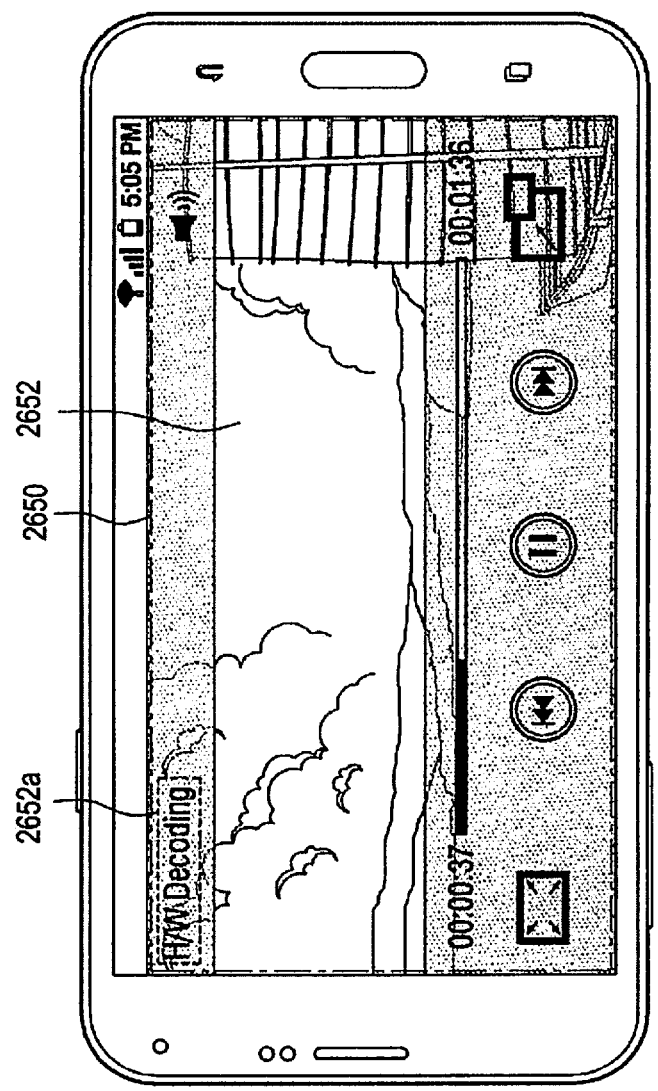

FIGS. 26A to 26D illustrate examples of a screen of an electronic device according to an embodiment of the present invention, and FIGS. 26E and 26F illustrate examples of a screen of an electronic device according to another embodiment of the present invention.

Referring to FIG. 24, in step S2410, a content display mode of an application corresponding to an assigned logical battery is configured in the electronic device.

Figure 25:
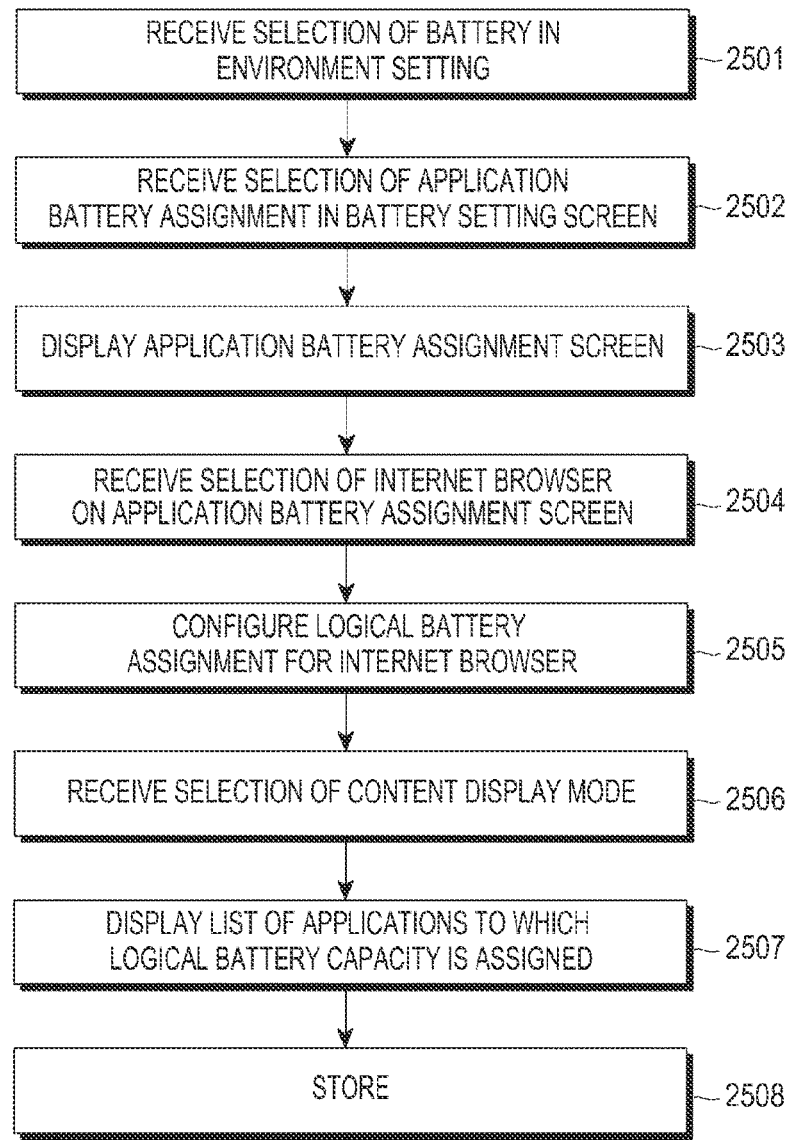
FIG. 25 is a flowchart illustrating a method of configuring a content display mode of an application, according to an embodiment of the present invention.

FIG. 25 is a flowchart illustrating a method of configuring a content display mode of an application, according to an embodiment of the present invention. For example, the method illustrated in FIG. 25 may be performed in step S2410 of FIG. 24.

FIGS. 27A to 27G illustrate an example of registering a content display method in an electronic device, according to an embodiment of the present invention.

Referring to FIG. 25, in step S2501, selection of a battery is received in environment settings.

Figure 27A:
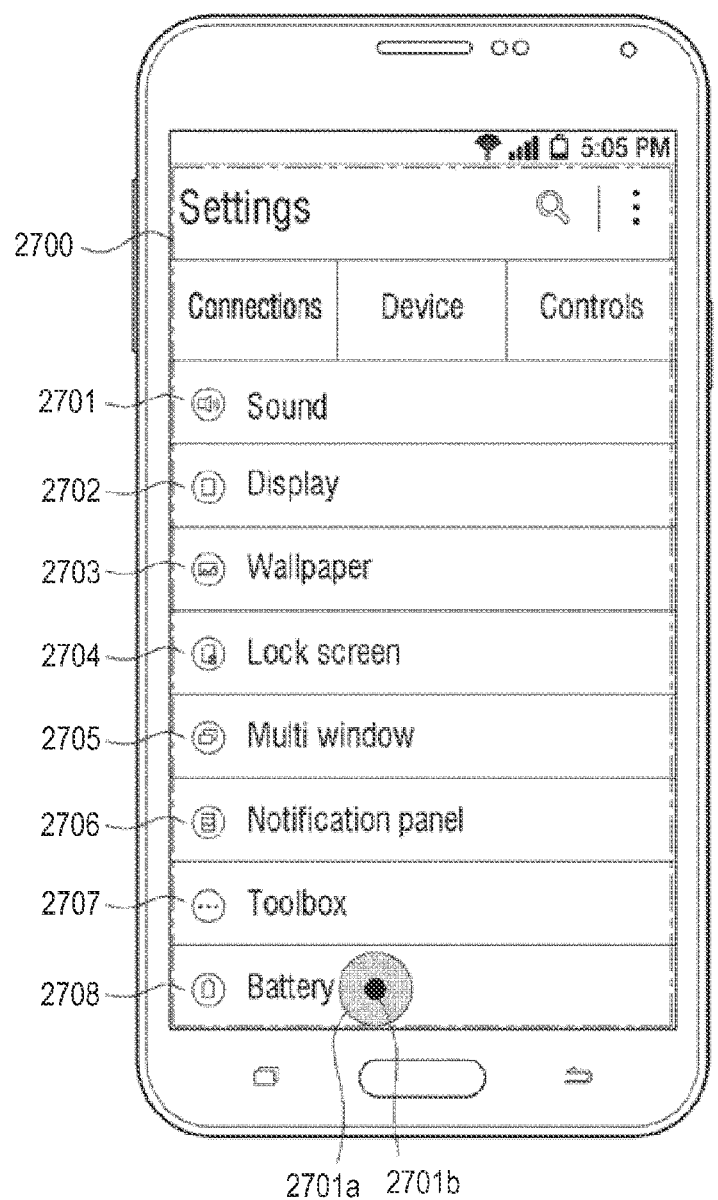
FIGS. 27A to 27G illustrate an example of registering an application in contacts of an electronic device according to an embodiment of the present invention.

For example, referring to FIG. 27A, on an environment setting screen 2700 of the electronic device, various functions of the electronic device may be configured by a user input (e.g., a touch input, a voice input, a motion input, etc.). Items that are configurable on the environment setting screen 2700 include sound 2701, display 2702, wallpaper 2703, lock screen 2704, multi-window 2705, notification panel 2706, toolbox 2707, and battery 2708. Clearly, the items that are configurable on the environment setting screen 2700 may be added to, changed, or deleted.

In order to assign a logical battery to an application and configure a content display method, a user inputs a touch 2701a on the battery 2708. For example, the electronic device may detect the touch 2701a using the touch screen 190 and the touch screen controller 195. The electronic device may calculate a touch location 2701b (e.g., X1 and Y1 coordinates) corresponding to the touch 2701a using an electric signal received from the touch screen controller 195.

The electronic device may store touch location information corresponding to the touch location 2701b in the storage unit 175. The stored touch location information may include a touch identifier (ID) for history management, a touch location, a touch detection time, or touch information (e.g., a touch pressure, a touch direction, a touch duration time, etc).

In addition, the electronic device may detect a hovering input using the touch screen 190 and the touch screen controller 195. The electronic device may calculate a hovering location corresponding to the hovering input using an electric signal received from the touch screen controller 195.

The electronic device may store hovering location information corresponding to the hovering location in the storage unit 175. The stored hovering location information may include a hovering detection location, a hovering detection time, or hovering information (e.g., a hovering height (h), a hovering direction, a hovering duration time, etc.).

Referring again to FIG. 25, in step S2502, selection of application battery assignment is received on a battery setting screen.

Figure 27B:
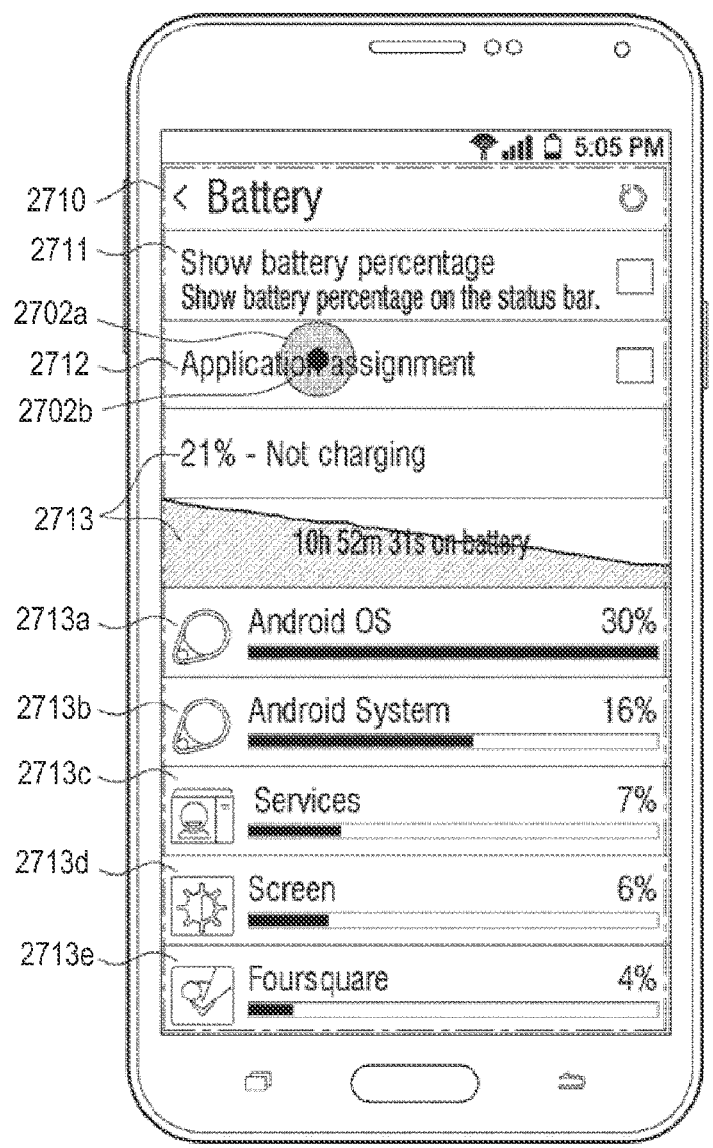

For example, referring to FIG. 27B, the electronic device displays a battery setting screen 2710 in response to the touch 2701a in FIG. 27A. Items that are configurable on the battery setting screen 2710 include, for example, battery percentage (%) display 2711, application assignment 2712, residual battery capacity and graph 2713, and software battery consumption indicators 2713a to 2713e. Obviously, the items that are configurable on the battery setting screen 2710 can be added to, changed, or deleted.

In FIG. 27B, the user inputs a touch 2702a on the application assignment 2712. For example, the electronic device detects the touch 2702a using the touch screen 190 and the touch screen controller 195, and calculates a touch location 2702b (e.g., X2 and Y2 coordinates) corresponding to the touch 2702a using an electric signal received from the touch screen controller 195.

Like the touch 2701a in FIG. 27A, the electronic device may store touch location information corresponding to the touch location 2702a and also detect a hovering input; however, a repetitive description thereof will be omitted.

Referring again to FIG. 25, in step S2503, an application battery assignment screen is displayed.

Figure 27C:
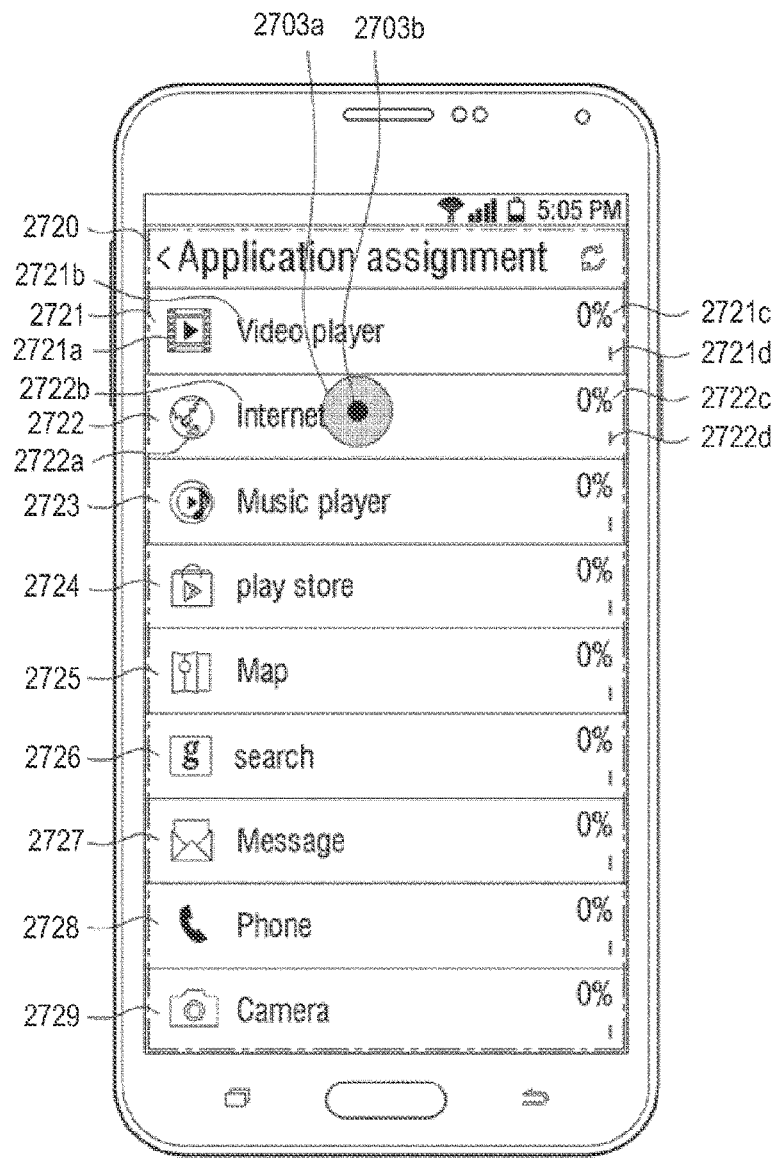

For example, referring to FIG. 27C, the electronic device displays an application battery assignment screen 2720 in response to the touch 2702a in FIG. 27B. Applications that are configurable on the application battery assignment screen 2720 include a video player application 2721, an Internet browser application 2722, a music player application 2723, a play-store application 2724, a map application 2725, a search application 2726, a message application 2727, a telephone application 2728, and a camera application 2729.

Items corresponding to the video player application 2721 may include an icon 2721a for the video player application

2721, an application name 2721*b*, an assigned logical battery capacity 2721*c*, and a battery bar 2721*d*.

In addition, items corresponding to the Internet browser application 2722 include an icon 2722*a* for the Internet browser application 2722, an application name 2722*b*, an assigned logical battery capacity 2722*c*, and a battery bar 2722*d*.

Additionally, as illustrated in FIG. 27C, items corresponding to the respective applications 2721 to 2729 are the same.

The assigned logical battery capacity 2722*c* may be displayed as a battery capacity (e.g., 250 mAh) assigned from a physical battery capacity or as a percentage (e.g., 15%) based on the physical battery capacity. The display method may also be identically applied to the battery bar 2722*d*.

Obviously, the applications that are configurable on the application battery assignment screen 2720 can be added to, changed, or deleted.

As described above, a battery may be divided into a physical battery and a logical battery. For example, the physical battery is a lithium ion battery or a lithium polymer battery that supplies power to an electronic device, and the logical battery is a virtual battery obtained by dividing the physical battery into one or more capacities.

The logical battery may include a logical battery for an emergency, i.e., which is used in case of an emergency, and a logical battery for a system that has the minimum capacity required for a system operation of the electronic device. The logical battery for the emergency and the logical battery for the system may prohibit user access. In addition, the logical battery for the emergency and the logical battery for the system may have a capacity determined in advance.

In response to a user input, the electronic device may assign a logical battery capacity to an application or a service provided by the electronic device. In addition, the electronic device may store, e.g., in the storage unit 175, a use history of the logical battery capacity assigned to the application or the service provided by the electronic device.

Further, the electronic device may manage the use history of the logical battery capacity assigned to the application or the service provided by the electronic device. For example, the use history may include the amount of a logical battery used for each application and/or service for a predetermined period of time (e.g., 1 day, 7 days, a month, a quarter, a year, etc.) or the maximum amount of a logical battery used for each application and/or service for a predetermined period of time (e.g., 1 day, 7 days, etc.).

Referring again to FIG. 25, in step S2504, selection of an application, e.g., an Internet browser application, is received on the application battery assignment screen.

Referring again to FIG. 27C, the user inputs a touch 2703*a* on the Internet browser application 2722 and the electronic device calculates a touch location 2703*b* (e.g., X3 and Y3 coordinates) corresponding to the touch 2703*a*, similar to the touch 2701*a* and touch location 2701*b* in FIG. 27A.

Accordingly, a repetitive description thereof will be omitted.

Referring again to FIG. 25, in step S2505, logical battery assignment for the Internet browser application is configured.

Figure 27D:
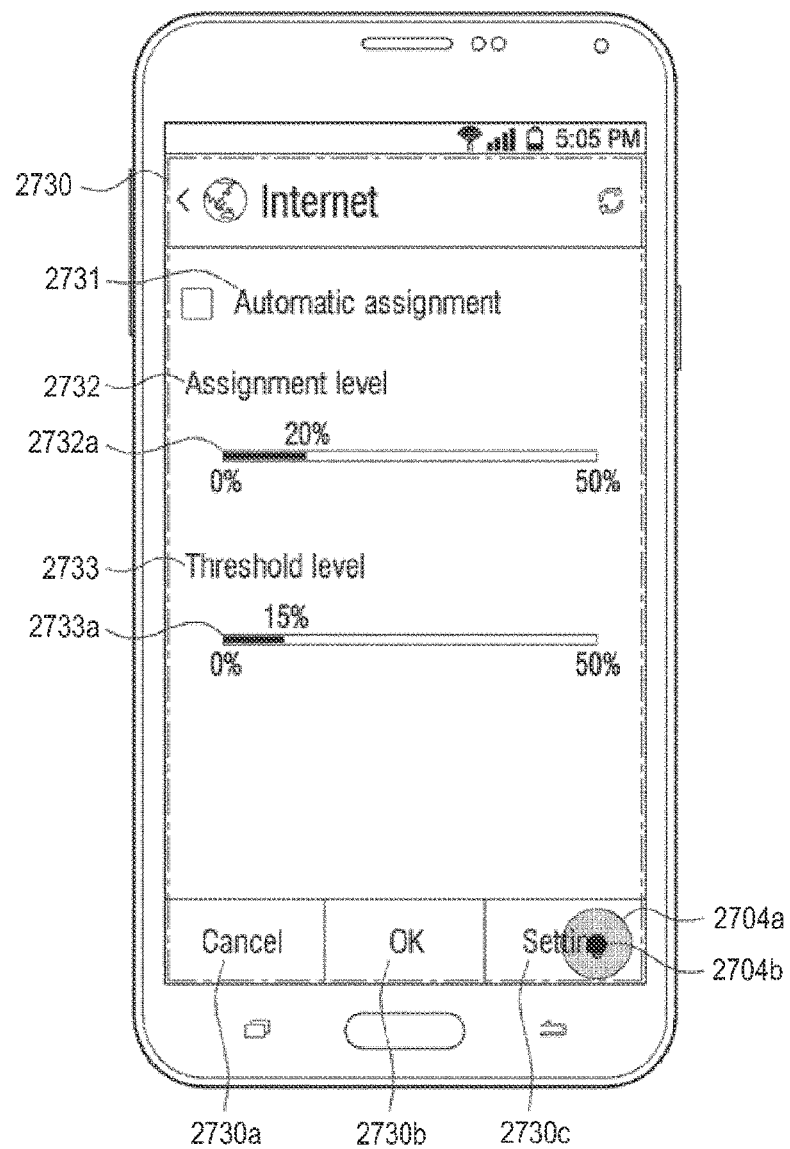

For example, referring to FIG. 27D, the electronic device displays an Internet browser battery assignment screen 2730 in response to the touch 2703*a* in FIG. 27C. Items that are configurable on the Internet browser battery assignment screen 2730 include automatic assignment 2731, assignment level 2732, and threshold level 2733.

In addition, non-application of assignment may be displayed in the items which are configurable on the Internet browser battery assignment screen 2730. For example, when the non-application of assignment is selected for the Internet browser application, the electronic device will not assign or turn off a logical battery capacity to the Internet browser application. The non-application of assignment may also be a default.

When the automatic assignment option 2731 is selected, the electronic device may assign a predetermined logical battery capacity (e.g., 10%), which changeable by a setting, to the Internet browser application.

Alternatively, the automatic assignment 2731 may not be displayed.

When the assignment level 2732 is selected, a logical battery capacity (e.g., %) for the Internet browser application may be assigned by the user. For example, an indicator 2732*a* having a logical battery assignment range of 0% to 50% may be set to 20% by a user input (e.g., a touch or a touch gesture).

When the threshold level option 2733 is selected, a threshold value for the assignment level (e.g., 20%) configured for the Internet browser application may be configured by the user. For example, an indicator 2733*a* having a logical battery threshold assignment range of 0% to 50% may be set to 15% by a user input (e.g., a drag).

Thereafter, when the consumption of the logical battery (e.g., 20%) assigned to the Internet browser application reaches the threshold level (e.g., 15%), the electronic device may display a pop-up window on the touch screen 190 and/or may output an alarm through a speaker 163.

Although a battery capacity assigned at the threshold level 2733 may be lower than that assigned at the assignment level 2732, the battery capacity assigned at the threshold level 2733 may not exceed that assigned at the assignment level 2732.

On the Internet browser battery assignment screen 2730, the assignment level 2732 and the threshold level 2733 may be set to the same level (e.g., 20%).

In addition, the automatic assignment option 2731 and/or the assignment level option 2732 may be displayed on the Internet browser battery assignment screen 2730.

When the assignment level 2732 is configured, a logical battery capacity at the assignment level 2732 may be the same as a threshold logical battery capacity at the threshold level 2733.

Figure 27E:
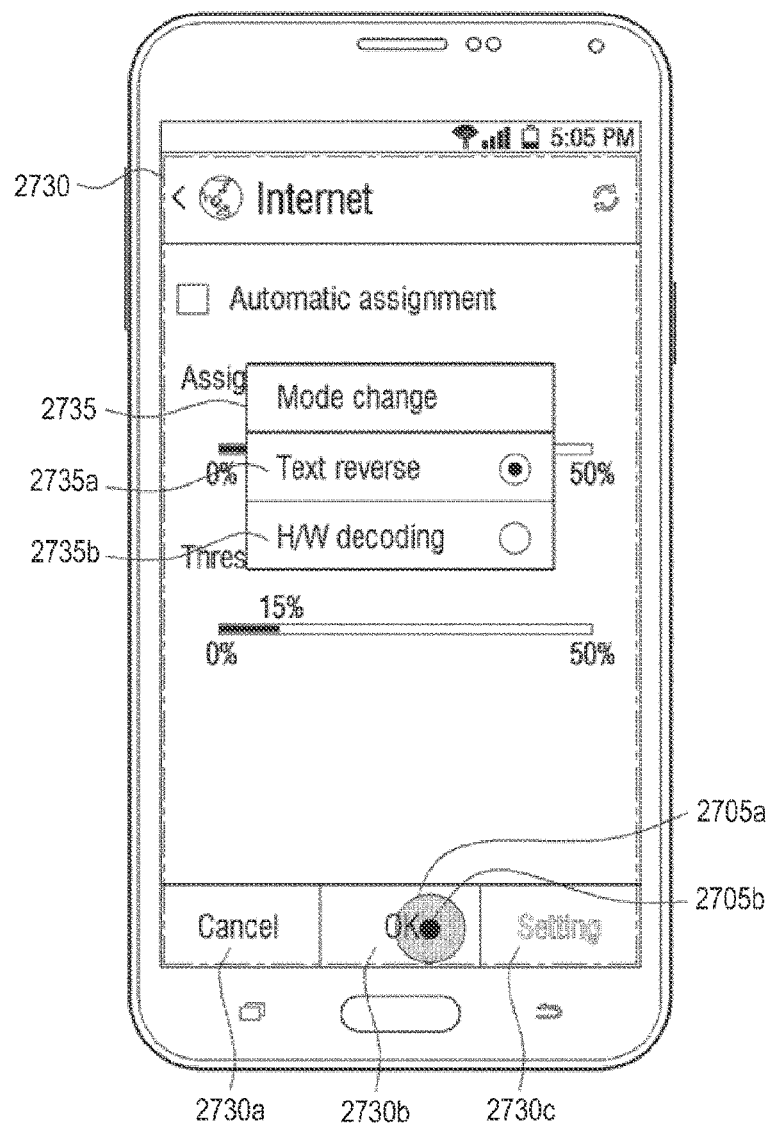

Thereafter, a user input a touch 2704*a* on a setting button 2730*c* among a cancel button 2730*a*, an OK button 2730*b*, and the setting button 2730*c* on the Internet browser battery assignment screen 2730, in response to the logical battery assignment for the Internet browser application. When the user inputs the touch 2704*a* on the OK button 2730*b*, the electronic device applies the configured logical battery assignment for the internet browser application. When the user inputs the touch 2074*a* on the cancel button 2030*a*, the electronic device cancels the configured logical battery assignment for the internet browser application. When the user inputs the touch 2704*a* on the setting button 2730*c*, the electronic device displays a pop-up window 2735, as illustrated in FIG. 27E, for configuring a content display mode.

The electronic device detects the fourth touch 2704*a* and calculates a fourth touch location 2704*b* (e.g., X4 and Y4 coordinates) corresponding to the fourth touch 2704*a* using an electric signal received from the touch screen controller 195.

The controller may store fourth touch location information corresponding to the fourth touch location 2704*a* in the storage unit. The stored fourth touch location information may include a touch identifier (ID) for history management, a touch location, a touch detection time, or touch information (e.g., a touch pressure, a touch direction, a touch duration time, and the like).

Since detection of fourth hovering in step S2505 of FIG. 25 is substantially the same as that of the first hovering in step S2501 of FIG. 25, a repetitive description thereof will be omitted.

Referring again to FIG. 25, in step S2506, selection of a content display mode is received.

Referring to FIG. 27E, the electronic device displays a pop-up window 2735 in response to the touch 2704a. Upon selecting the setting button 2730c in FIG. 27D, the user may configure a content display mode through the pop-up window 2735. For example, the content display mode includes a displayed-text reverse mode 2735a or a hardware (H/W) decoding mode 2735b. In the text reverse mode 2735a, the electronic device may reverse content displayed on a screen of an application (e.g., the Internet browser application) exceeding a threshold logical battery capacity configured for an assigned logical battery capacity, and may display the reversed content. For example, when a background color of the application screen is white and a text color is black, the controller may change the background color into black and the text color into white.

In addition, the text reverse mode 2735a may include various text reverse modes. For example, the text reverse mode may include text reverse mode 1, wherein a background color is dark gray and a text color is light gray, a text reverse mode 2, wherein a background color is black and a text color is light gray, or text reverse mode 3, wherein a background color is black and a text color is dark gray.

The consumption of the logical battery assigned to the Internet browser application may be reduced through the text reversing. In addition, the battery consumption of the electronic device may be reduced through the text reversing.

For a display panel (e.g., a TFT-LCD, an AMOLED, etc) of the touch screen 190, battery consumption may be determined by a screen brightness. Comparing display panels, such as OLEDs, having the same brightness but different background colors, namely, black and white, respectively, battery consumption of the electronic device having the black background may be reduced.

In the electronic device charged to a level of 100%, when an Internet browser in which a background color is white and a text color is black is used for one hour, a residual battery capacity may be about 95%, and a battery capacity of 5% may be consumed. In contrast, when an Internet browser in which a background color is black and a text color is white is used for one hour, a residual battery capacity may be about 96.7%, and a battery capacity of 3.3% may be consumed. It will be easily understood by those skilled in the art that there may be a difference battery consumption according to experimental conditions.

In the hardware decoding mode 2735b, the electronic device may change, through hardware decoding, rather than software decoding, content (e.g., a video or audio) displayed on a screen of an application (e.g., the video player application) exceeding a threshold logical battery capacity configured for an assigned logical battery capacity.

The consumption of the logical battery assigned to the video player application may be reduced through the hardware decoding. In addition, the battery consumption of the electronic device may be reduced through the hardware decoding.

The hardware decoding includes decoding using a decoder of a GPU. The software decoding includes decoding using the processor 111 and decoding using a software coder embedded in an application. For example, when a video file has a file extension of 3g2, 3gp, or mp4, the electronic device may perform hardware decoding. When a video file has a file extension of avi, mpg, mpeg, or mkv, the electronic device may perform software decoding.

When the electronic device performs the software decoding, battery consumption may increase due to an increase in a processor occupancy rate of the electronic device.

In the electronic device charged to a level of 100%, when a video file with a resolution of 1280×720, a playback time of 24 minutes, H.264 encoding, 93.976 FPS, and AAC 48000 Hz is reproduced through hardware coding in the video player application, a residual battery capacity may be 95%, and a battery capacity of 5% may be consumed. When the same video file is reproduced through software decoding in the video player application, a residual battery capacity may be 88%, and a battery capacity of 12% may be consumed. It will be easily understood by those skilled in the art that there may be a difference in battery consumption according to experimental conditions.

The content display modes may include a screen brightness change, wherein the electronic device may change (e.g., darken) a screen brightness of an application (e.g., the Internet browser application) exceeding a threshold logical battery capacity (e.g., 15%) configured for an assigned logical battery capacity (e.g., 20%) to display content. For example, when a current screen brightness of an application is 85% of the maximum brightness, the electronic device may decrease the screen brightness to 35% of the maximum brightness in the screen brightness change mode. Thereafter, the screen brightness (e.g., 35%) may be changed by a user setting or may be determined in advance under the control of the controller.

The consumption of a logical battery assigned to an application may be reduced through a screen brightness change. In addition, the battery consumption of the electronic device may be reduced through text reversing.

It may be easily understood by those skilled in the related art that the content display modes may be applied to a function or service capable of reducing consumption of a logic battery assigned to an application as well as the text reverse 2735a, the hardware coding 2735b, and/or the screen brightness change according to an embodiment of the present invention.

Figure 27F:
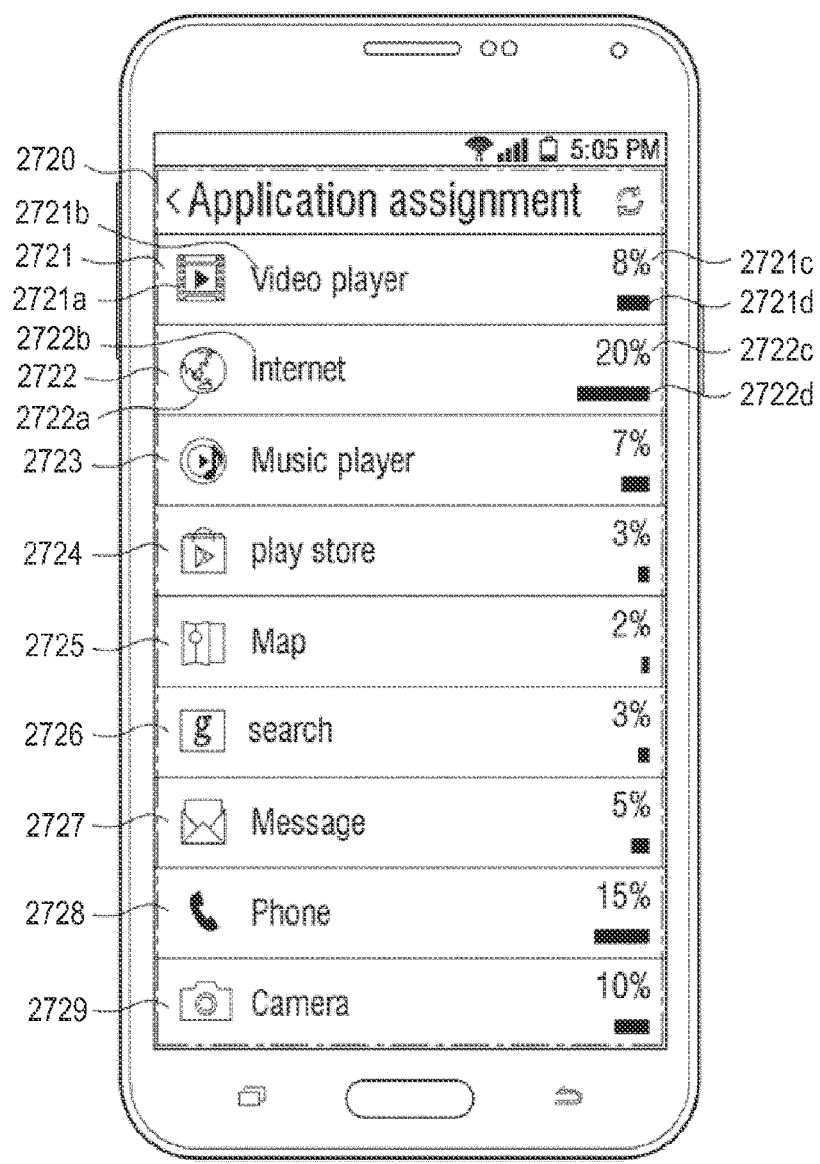
Figure 27G:
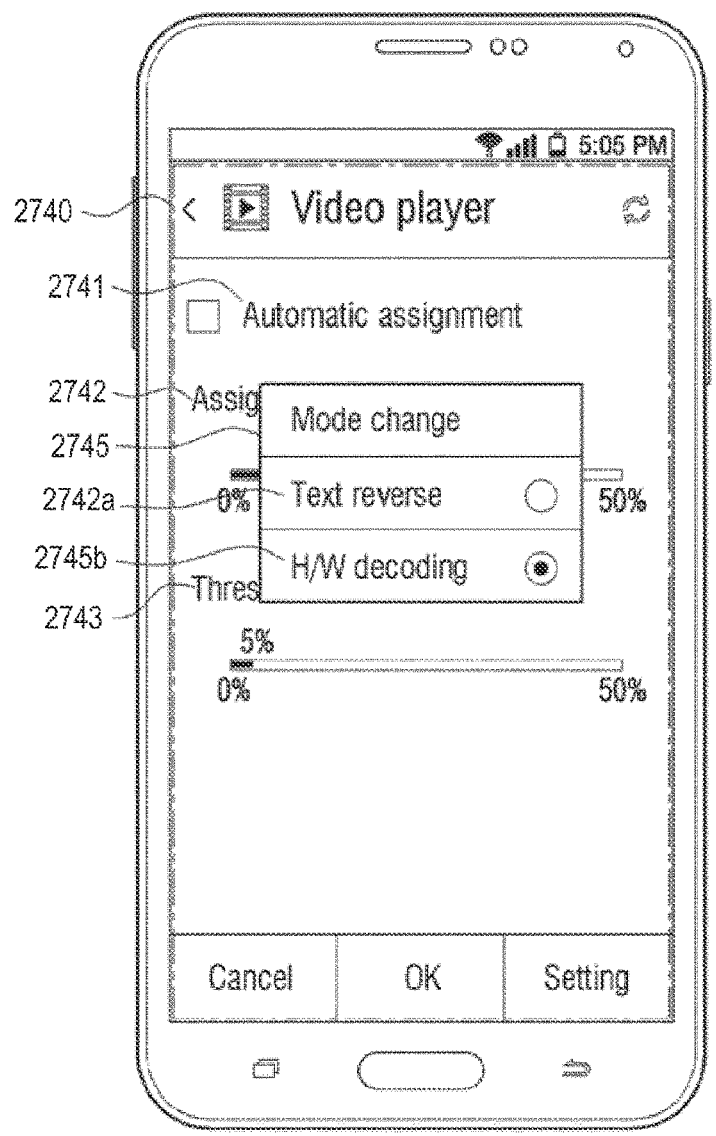

Similarly, when a touch is detected on another application (e.g., the video player application 2721), the electronic device displays a video player battery assignment screen 2740 corresponding to the touch, as illustrated in FIG. 27G.

On the video player battery assignment screen 2740, the user may configure automatic assignment 2741, an assignment level 2742, and/or a threshold level 2743 for the video player application.

In response to a user selection of the setting button of the video player battery assignment screen 2740, the electronic device displays a pop-up window 2745. The user may then select a content display mode (e.g., a text reverse mode 2735a or a hardware decoding 2745b) through the pop-up window 2745.

The consumption of the logical battery assigned to the video player application may be reduced through the hardware decoding. In addition, the battery consumption of the electronic device may be reduced through the hardware decoding.

Since logical battery assignment and content display mode setting for the video player application in FIG. 27G is substantially the same as that of the Internet browser application illustrated in FIGS. 27D and 27E, a repetitive description thereof will be omitted.

It may be easily understood by those skilled in the art that a change of a content display mode of an application to which a logical battery capacity is assigned may include various applications, various logical battery capacity assignments, and/or various threshold logical battery assignments according to an embodiment of the present invention.

Referring to FIG. 27E, when one of the text reverse 2735a and the hardware decoding 2735b is selected in the displayed content display mode, the electronic device may make the pop-up window 2735 disappear from the screen.

The user may also input a touch 2705a at a touch location 2705b on the OK button 2730b of the Internet browser battery assignment screen 2730, either before or after the pop-up window 2735 has disappeared, in order to complete the assignment.

The controller may detect the fifth touch 2705a using the touch screen 190 and the touch screen controller 195. The controller may calculate a fifth touch location 2705b (e.g., X5 and Y5 coordinates) corresponding to the fifth touch 2705a using an electric signal received from the touch screen controller 195.

The controller may store fifth touch location information corresponding to the fifth touch location 2705a in the storage unit. The stored fifth touch location information may include a touch identifier (ID) for history management, a touch location, a touch detection time, or touch information (e.g., a touch pressure, a touch direction, a touch duration time, and the like).

Since detection of fifth hovering in step S2506 of FIG. 25 is substantially the same as that of the first hovering in step S2501 of FIG. 25, a repetitive description thereof will be omitted.

Referring again to FIG. 25, in step S2507, a list of applications to which a logical battery capacity is assigned is displayed on the application battery assignment screen.

Referring to FIG. 27F, in response to the touch 2705a in FIG. 27E, the electronic device displays the application battery assignment screen 2720 including a list of applications to which a logical battery capacity is assigned.

In response to the content display mode setting of the applications to which a logical battery capacity is assigned, the electronic device may change the application battery assignment screen 2720 of FIG. 27C to the application battery assignment screen 2720 of FIG. 27F. The electronic device may change some items 2722c and 2722d of the relevant items 2722a to 2722d of the Internet browser application 2722 and display the same on the application battery assignment screen 2720.

Referring to FIG. 27F, in response to a user input, the electronic device may change some items corresponding to various applications 2721 and 2723 to 2729 as well as the Internet browser application 2722 and display the same.

Referring again to FIG. 25, in step S2508, application battery assignment information is stored.

The electronic device may store, e.g., in the storage unit 175, the application battery assignment information corresponding to the configured content display mode of an application to which a logical battery capacity is assigned. The application battery assignment information stored in the storage unit may include, for example, an ID for history management, an application name, whether or no automatic assignment is used, an automatic assignment logical battery capacity, an assigned logical battery capacity, a threshold logical battery capacity, a logical battery capacity setting time, a usable time of a logical battery, a content display mode, etc.

Logical battery capacities, threshold logical battery capacities, and/or content display modes that correspond to respective applications may be different from each other. For example, when logical battery capacities assigned to a plurality of applications are the same, threshold logical battery capacities assigned to the respective applications may be different from each other. In addition, content display modes configured for the respective applications may also be different from each other.

The application battery assignment information may be stored one by one in response each application or may be stored at one time for all the applications displayed in the application list.

After step S2508, when the application battery assignment information is stored, the configuration of the content display mode for an application to which a logical battery capacity is assigned is completed.

Referring again to FIG. 24, in step S2420, an application is executed. For example, a shortcut icon corresponding to the application (e.g., an Internet browser) is selected by a user input in the electronic device.

For example, referring to FIG. 26A, the electronic device displays an Internet browser screen 2600 corresponding to the selected shortcut icon on the display of the electronic device. A web page 2601 configured with an image and text is displayed on the Internet browser screen 2600. The background color of the web page 2601 is white, and the text color is black.

When the application is executed, the electronic device may display, on a status bar, the logical battery capacity assigned to the executed application (e.g., Internet browser) and and/or the threshold logical battery capacity. The logical battery capacity or the threshold logical battery capacity that can be displayed on the status bar may be displayed as an icon and/or text (e.g., including %) corresponding to the battery capacity.

Referring to FIG. 26O, another application (e.g., a video player) screen 2650 is displayed in the electronic device according to another embodiment of the present invention. Content (e.g., a video 2651) is displayed on the video player screen 2650. The controller may perform software decoding on the content to display the same on the video player screen 2650.

Referring again to FIG. 24, in step S2430, battery consumption corresponding to the executed application is detected.

When the application (e.g., Internet browser) is executed, the electronic device may detect battery consumption of the executed application through a detection unit according to a predetermined period (e.g., 10 sec, changeable). The electronic device may calculate the battery consumption of the executed application using a voltage (or current) detected through the detection unit. For example, based on a voltage (or current) when the electronic device is charged to a level of 100%, the electronic device may calculate physical battery consumption using the currently detected voltage (or current).

The electronic device may also store the detected voltage (or current) and/or the calculated battery consumption in the storage unit 175. In addition, the electronic device may update the use history of the logical battery capacity using the use history of the calculated physical battery consumption and the stored logical battery capacity.

According to another embodiment, when another application (e.g., the video player) is executed, detecting battery consumption of the executed application through the detection unit according to a predetermined period (e.g., 15 sec, changeable) is substantially similar to detecting the battery consumption, in step S2430 of FIG. 24; therefore, a repetitive description thereof will be omitted.

In step S2440, the electronic device determines whether the battery consumption exceeds a preset threshold logical battery capacity.

For example, the electronic device may compare the battery consumption calculated by the execution of the application (e.g., the Internet browser) with the logical battery capacity (e.g., 20%) and the threshold logical battery capacity (e.g., 15%) of the stored application battery assignment information. The controller may compare the calculated battery consumption with the logical battery capacity (e.g., 20%) and the threshold logical battery capacity (e.g., 15%) of the application battery assignment information in the use history of the stored logical battery capacity.

For example, when the detected battery consumption corresponding to the execution of the application is 16%, the electronic device may determine that the detected battery consumption exceeds the preset threshold logical battery capacity. In addition, when the detected battery consumption corresponding to the execution of the application is 15.1% the electronic device may determine that the detected battery consumption exceeds the preset threshold logical battery capacity.

According to another embodiment, determining whether battery consumption calculated by execution of another application (e.g., the video player) exceeds the preset threshold logical battery capacity is substantially similar to determining, in step S2440 of FIG. 24, whether the battery consumption exceeds the threshold logical battery capacity; therefore, a repetitive description will be omitted.

As illustrated in FIG. 27D, a logical battery capacity of the assignment level 2732 may be the same as a threshold logical battery capacity of the threshold level 2733. In this case, the electronic device may compare the battery consumption with the preset logical battery capacity (or the preset threshold logical battery capacity). According to the comparison result, the electronic device may determine that the detected battery consumption exceeds the preset logical battery capacity (or the preset threshold logical battery capacity).

When the detected battery consumption corresponding to the execution of the application is less than 15%, i.e., when the electronic device determines that the battery consumption does not exceed the preset threshold logical battery capacity, the operation returns to step S2430.

However, when the electronic device determines that the battery consumption exceeds a preset threshold logical battery capacity, in step S2450, the content display mode of the executed application is changed.

Referring to FIGS. 26B and 26C, when the detected battery consumption exceeds the preset threshold logical battery capacity, the electronic device displays a pop-up window 2610 notifying the user of the exceeding of the threshold logical battery capacity of the application. The pop-up window 2610 includes an explanation 2611, a cancel button 2610a, an OK button 2610b, and a setting button 2610c.

When the user selects the OK button 2610b or when a predetermined time (e.g., 500 msec, changeable) passes, the electronic device may make the pop-up window 2610 disappear.

When the pop-up window 2610 disappears, the electronic device may change the content display mode of the application screen. For example, the electronic device may change the web page 2601 (e.g., a background color is white and a text color is black) displayed on the application screen 2600 into a reversed web page 2602 (e.g., a background color is black and a text color is white), as illustrated in FIG. 26C.

Alternatively, when the pop-up window 2610 disappears, the electronic device may change the web page 2601 (e.g., a background color is white and a text color is black) displayed on the application screen 2600 into a modified reversed web page (e.g., where a background color is black and a text color is a color other than black or white).

When the detected battery consumption exceeds the preset threshold logical battery capacity, the electronic device may change the content display mode of the application screen without displaying the pop-up window 2610.

In addition, when the user selects the setting button 2610c of the pop-up window 2610, the electronic device may receive a user selection of another content display mode (e.g., a screen brightness change mode, not illustrated), e.g., as described in step S2506 of FIG. 25 and illustrated in FIG. 27B.

When the other content display mode is changed by the user, the electronic device may display the screen illustrated in FIG. 26B again.

When the user selects the OK button 2610b of the pop-up window 2610 on the screen of FIG. 26B, the electronic device may apply the other content display mode.

When the user presses the Cancel button 2610a, the electronic device does not change the content display mode.

As illustrated in FIG. 27D, the logical battery capacity of the assignment level 2732 may be the same as the threshold logical battery capacity of the threshold level 2733. When the detected battery consumption exceeds the preset logical battery capacity (or the preset threshold logical battery capacity), the electronic device may display a pop-up window indicating that the logical battery capacity of the application has been exceeded and change the content display mode of the application screen.

In addition, when the detected battery consumption exceeds the preset logical battery capacity (or the preset threshold logical battery capacity), the electronic device may change the content display mode of the application screen without displaying the pop-up window.

The consumption of the logical battery assigned to the Internet browser is reduced through the text reverse mode 2735a so that the Internet browser can be executed for a longer period of time than usual. Further, the battery consumption of the electronic device is reduced through the text reverse mode 2735a so that the mobile phone can be used for a longer period of time than usual.

FIGS. 26E and 26F illustrate an example of changing a content display mode of an application according to another embodiment of the present invention.

Referring to FIGS. 26E and 26F, when the detected battery consumption exceeds a preset threshold logical battery capacity, the electronic device displays a pop-up window 2660. The pop-up window 2660 includes an explanation 2661 corresponding to threshold logical battery capacity being exceeded, a cancel button 2660a, an OK button 2660b, and a setting button 2660c.

When a user selects the OK button 2660b or when a predetermined time (e.g., 500 msec, changeable) passes, the electronic device may make the pop-up window 2660 disappear.

When the pop-up window 2660 disappears, the electronic device may change a content display mode of an application screen. For example, the electronic device displays, on the application screen 2650, hardware-decoded content 2652, rather than software-decoded content 2651.

When the pop-up window 2660 disappears, the electronic device may display, on the application screen 2650, the hardware-decoded content 2652 together with separate text "H/W Decoding" 2652a, rather than software-decoded content 2651. The separate text may have transparency. The separate text may be displayed to be superposed on the hardware-decoded content 2652.

In addition, for content that does not support hardware decoding (e.g., content encoded through H.264, WMV, or the like), the electronic device may display, on the application screen, a pop-up window corresponding to the non-support for the hardware decoding. The user may select one of a cancel button, a software decoding maintenance button, and a setting button that are included in the pop-up window.

When the detected battery consumption exceeds the preset threshold logical battery capacity, the electronic device may also change the content display mode of the application screen, without displaying the pop-up window 2660.

In addition, when the user selects the Setting button 2660c of the pop-up window 2660, the controller may receive a user selection of another content display mode (e.g., a screen brightness change mode, not illustrated) as described in step S2506 of FIG. 25 and illustrated is FIG. 27G.

When the other content display mode is changed by the user, the controller may display the screen of FIG. 26B again.

When the user selects the OK button 2660b of the pop-up window 2660 on the screen illustrated in FIG. 26B, the electronic device may apply the other content display mode (e.g., the screen brightness change mode, not illustrated) changed through the setting button 2660c to the application screen.

As illustrated in FIG. 27D, the logical battery capacity of the assignment level 2732 may be the same as the threshold logical battery capacity of the threshold level 2733.

When the detected battery consumption exceeds the preset logical battery capacity (or the preset threshold logical battery capacity), the electronic device may display a pop-up window indicating that the logical battery capacity of the application has been exceeded and change the content display mode of the application screen.

In addition, when the detected battery consumption exceeds the preset logical battery capacity (or the preset threshold logical battery capacity), the electronic device may change the content display mode of the application screen, without displaying the pop-up window.

The consumption of the logical battery assigned to the video player is reduced through the hardware decoding mode 2735b so that the video player can be executed for a longer period of time than usual. Further, the battery consumption of the electronic device is reduced through the hardware decoding mode 2735b so that the mobile phone can be used for a longer period of time than usual.

In addition, the electronic device may provide, to the user, feedback corresponding to the change of the content display mode of the application screen. The feedback may be provided to the user using one of visual feedback, auditory feedback, and tactile feedback. The electronic device may provide, to the user, one of the visual feedback, the auditory feedback, and the tactile feedback or a combination thereof.

Through the visual feedback, a visual effect (e.g., a separate image or an animation effect applied thereto, such as fading) corresponding to the change of the content display mode of the application screen may be displayed to be distinguishable from the displayed application screen 2600.

The auditory feedback, e.g., a sound corresponding to the change of the content display mode of the application screen, may be output through the speaker 163.

The tactile feedback may be output through the vibration motor 164 to correspond to the change of the content display mode of the application screen.

The feedback may be maintained from when the at least one pop-up window 2610 is displayed to when the content display mode of the application screen is changed.

In an environment setting of the electronic device, the user may also select and/or change the feedback (e.g., at least one of visual feedback, auditory feedback, and tactile feedback) corresponding to the change of the content display mode of the application screen.

The user may input and/or change a feedback providing time (e.g., 700 msec, changeable) for which at least one piece of feedback is provided to the user.

When the content display mode of the application screen is changed as described in step S2450 of FIG. 24, the content display method of the electronic device is completed.

The above-described methods according to embodiments of the present invention may be implemented in a form of program commands executed through various computer devices to be recorded in a computer readable medium. The computer readable medium may include a program command, a data file, a data structure, and the like independently or in combination. Software may be stored, for example, in a volatile or non-volatile storage device such as a Read Only Memory (ROM), a memory such as a Random Access Memory (RAM), a memory chip, a memory device, or a memory Integrated Circuit (IC), or a storage medium that is optically or magnetically recordable and simultaneously machine (for example, a computer)-readable, such as a Compact Disc (CD), a Digital Versatile Disc (DVD), a magnetic disk, or a magnetic tape, regardless of its ability to be erased or re-recorded.

It can be seen that a memory which may be included in the electronic device corresponds to an example of the storage medium suitable for storing a program or programs including instructions by which the embodiments of the present invention are realized. The program command recorded in the medium may be things specially designed and configured for the present invention, or things that are well known to and can be used by those skilled in the computer software related art.

Although the present invention has been described by the restricted embodiments and the drawings as described above, the present invention is not limited to the aforementioned embodiments, and various modifications and alterations can be made from the descriptions by those skilled in the art to which the present invention pertains.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A content display method of an electronic device, the content display method comprising:

displaying an application in the electronic device;

detecting that a battery consumption of the application exceeds a threshold logical battery capacity assigned to the application;

displaying a notification indicating that the battery consumption exceeds the threshold, the notification comprising a first option to change a content display mode of the application to a preset content display mode and a second option to change the preset content display mode; and changing the content display mode to the preset content display mode upon selection of the first option or upon changing the preset content display mode.

2. The content display method of claim 1, further comprising storing application battery assignment information including a name of the application, a logical battery capacity assigned to the application, the threshold logical battery capacity assigned to the application, and the preset content display mode, wherein the logical battery capacity of the application is greater than or equal to the threshold logical battery capacity of the application.

3. The content display method of claim 1, wherein the notification comprises a pop-up window.

4. The content display method of claim 3, wherein the second option comprises changing a setting of the preset content display mode of the application using the pop-up window.

5. The content display method of claim 1, wherein changing the content display mode comprises one of:

reversing text and background colors on an application screen;

hardware decoding the application; and changing a brightness of the application screen.

6. The content display method of claim 1, further comprising storing another application battery assignment information including a name of another application, another logical battery capacity assigned to the another application, another threshold logical battery capacity assigned to the another application, and another content display mode change, which are different than the name of the application, the logical battery capacity assigned to the application, the threshold logical battery capacity assigned to the application, and the preset content display mode.

7. The content display method of claim 1, further comprising displaying at least one of an icon corresponding to the logical battery capacity and an icon corresponding to the threshold logical battery capacity.

8. The content display method of claim 7, wherein the at least one of the icon corresponding to the logical battery capacity and the icon corresponding to the threshold logical battery capacity are displayed on a status bar of the electronic device.

9. The content display method of claim 1, further comprising providing at least one of a visual feedback, an auditory feedback, and a tactile feedback, in response to changing the content display mode.

10. An electronic device comprising:

a touch screen that displays an application; and a controller that detects that battery consumption of the application exceeds a threshold logical battery capacity assigned to the application, displays a notification indicating that the battery consumption exceeds the threshold, the notification comprising a first option to change a content display mode of the application to a preset content display mode and a second option to change the preset content display mode, and changes the content display mode to the preset content display mode upon selection of the first option or upon changing the preset content display mode.

11. The electronic device of claim 9, further comprising a storage unit that stores application battery assignment information including a name of the application, a logical battery capacity assigned to the application, the threshold logical battery capacity assigned to the application, and the preset content display mode, wherein the logical battery capacity of the application is greater than or equal to the threshold logical battery capacity of the application.

12. The electronic device of claim 11, wherein the storage unit stores another application battery assignment information including a name of another application, another logical battery capacity assigned to the another application, another threshold logical battery capacity assigned to the another application, and another content display mode change, which are different than the name of the application, the logical battery capacity assigned to the application, the threshold logical battery capacity assigned to the application, and the preset content display mode.

13. The electronic device of claim 10, wherein the touch screen displays at least one of an icon corresponding to the logical battery capacity and an icon corresponding to the threshold logical battery capacity.

14. The electronic device of claim 13, wherein the at least one of the icon corresponding to the logical battery capacity and the icon corresponding to the threshold logical battery capacity are displayed on a status bar of the electronic device.

15. The electronic device of claim 11, further comprising a detection unit that detects a voltage of the electronic device, wherein the controller calculates the battery consumption of the application using the voltage detected by the detection unit.

16. The electronic device of claim 15, wherein the controller compares the battery consumption of the application with at least one of the logical battery capacity assigned to the application and the threshold logical battery capacity assigned to the application.

17. The electronic device of claim 10, wherein the controller changes the content display mode using one of text and background color reversing on an application screen, changing of decoding of the application into hardware decoding, and changing of a brightness of the application screen.

18. The electronic device of claim 10, wherein the touch screen provides at least one of a visual feedback and a tactile feedback, in response to the controller changing the content display mode.

19. The electronic device of claim 10, further comprising a speaker that provides an auditory feedback, in response to the controller changing the content display mode.

20. A content display method of an electronic device, the content display method comprising:

storing application battery assignment information including a name of an application, a logical battery capacity assigned to the application, a threshold logical battery capacity assigned to the application, and a preset content display mode;

displaying the application in the electronic device; and detecting that a battery consumption of the application exceeds the logical battery capacity;

displaying a notification indicating that the battery consumption exceeds the threshold, the notification comprising a first option to change a content display mode of the application to a preset content display mode and a second option to change the preset content display mode; and changing the content display mode to the preset content display mode upon selection of the first option or upon changing the preset content display mode, wherein the logical battery capacity of the application is the same as the threshold logical battery capacity of the application.

\* \* \* \* \*